(12) United States Patent
Byrne

(10) Patent No.: US 7,736,178 B2
(45) Date of Patent: Jun. 15, 2010

(54) EXPANDABLE POWER AND DATA CENTER ADAPTED FOR USE WITH MULTIPLE MOUNTS

(76) Inventor: Norman R. Byrne, 2736 Honey Creek NE., Ada, MI (US) 49301

( * ) Notice: Subject to any disclaimer, the term of this patent is extended or adjusted under 35 U.S.C. 154(b) by 32 days.

(21) Appl. No.: 11/917,264

(22) PCT Filed: Jun. 13, 2006

(86) PCT No.: PCT/US2006/022896

§ 371 (c)(1),
(2), (4) Date: Dec. 12, 2007

(87) PCT Pub. No.: WO2006/138258

PCT Pub. Date: Dec. 28, 2006

(65) Prior Publication Data

US 2009/0142947 A1    Jun. 4, 2009

Related U.S. Application Data

(60) Provisional application No. 60/690,020, filed on Jun. 13, 2005, provisional application No. 60/700,526, filed on Jul. 19, 2005.

(51) Int. Cl.
*H01R 13/601* (2006.01)

(52) U.S. Cl. .................. 439/574; 439/527; 439/534

(58) Field of Classification Search ................ 439/574, 439/575, 527, 534, 542
See application file for complete search history.

(56) References Cited

U.S. PATENT DOCUMENTS

| | | | | |
|---|---|---|---|---|
| 5,057,039 A * | 10/1991 | Persing et al. | ............. | 439/574 |
| 6,004,157 A * | 12/1999 | Glass | .......... | 439/574 |
| 6,028,267 A * | 2/2000 | Byrne | .......... | 174/59 |
| 6,290,518 B1 * | 9/2001 | Byrne | .......... | 439/131 |
| 6,435,461 B1 * | 8/2002 | Saylor et al. | .......... | 248/231.71 |
| 6,923,684 B2 * | 8/2005 | Strayer | .......... | 439/652 |
| 6,971,911 B2 * | 12/2005 | Ramsey et al. | .......... | 439/574 |

\* cited by examiner

*Primary Examiner*—Neil Abrams
*Assistant Examiner*—Phuong Nguyen
(74) *Attorney, Agent, or Firm*—Varnum, Riddering, Schmidt & Howlett LLP

(57) ABSTRACT

An expandable power and data center (300) is mounted to a work surface (332), and includes a front face surface (302). Extending outwardly from an aperture (338) within the face (302) are power receptacles (310) and data ports (312). A housing (322) extends rearwardly of the front face (302) and includes a bracket mount (340). The bracket mount (340) is formed by the rear portion (330) of the housing (322) having a central portion (348) intermediate a set of L-slots (342). The L-slots (342) releasably engage various configurations of mounting brackets (350, 390) for use in mounting the power and data center (300) to various types of surfaces.

1 Claim, 16 Drawing Sheets

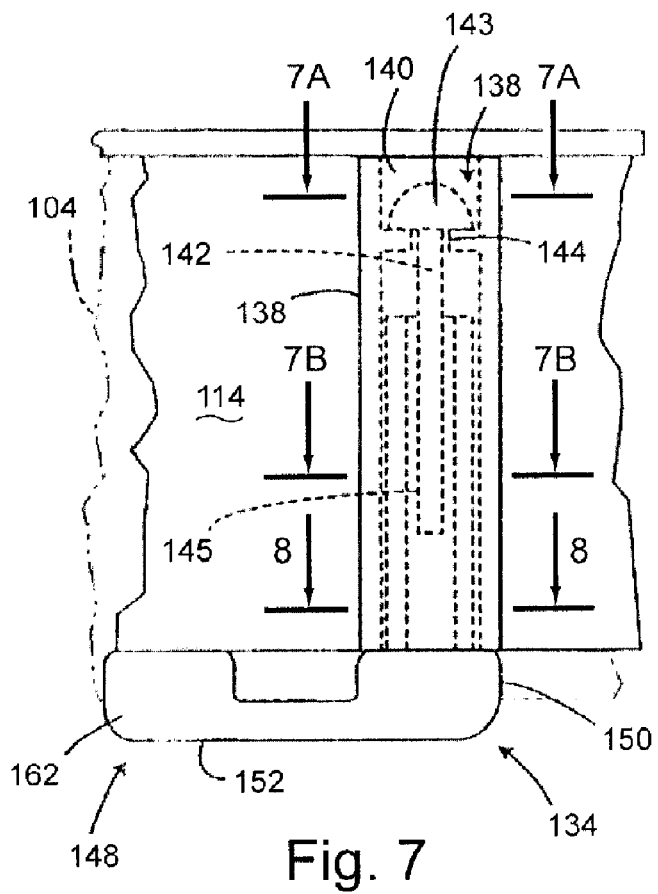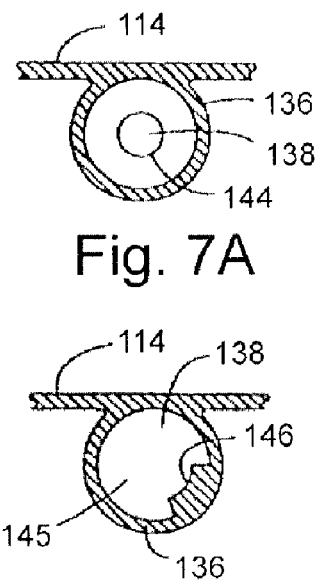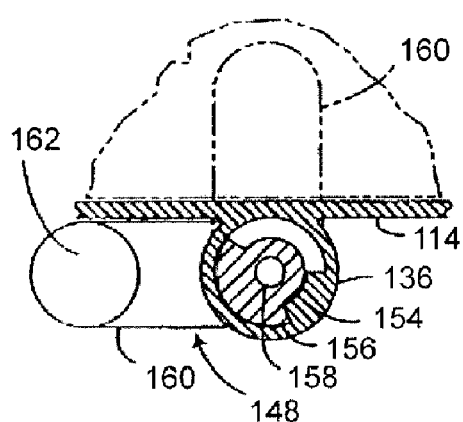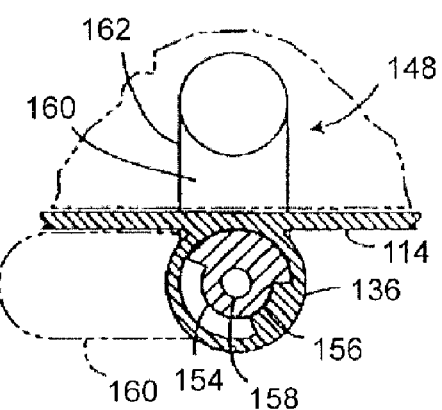
Fig. 7
Fig. 7A
Fig. 7B
Fig. 8
Fig. 9

EXPANDABLE POWER AND DATA CENTER ADAPTED FOR USE WITH MULTIPLE MOUNTS

CROSS-REFERENCE TO RELATED APPLICATIONS

This application is based on and claims priority of U.S. Provisional Patent Application Ser. No. 60/690,020, filed Jun. 13, 2005, and U.S. Provisional Application Ser. No. 60/700,526, filed Jul. 19, 2005.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The invention relates to electrical power, and power and data distribution systems and, more particularly, to power and data center systems having capabilities of expansion and further having capabilities of being mounted to work surfaces and the like.

DESCRIPTION OF RELATED ART

The use of computers, sophisticated telecommunications equipment and other electronic devices is continuing to rapidly increase in commercial, industrial and other office environments. As a result, the importance of efficiently supplying power throughout these environments is also increasing. Historically, one problem common to the use of electrical power and communications equipment is the positioning of electrical power outlets and communication ports, such as conventional RS-232 voice/data interface connectors. The communication ports are often referred to as Adata ports @ or Avoice/data ports. @ Positioning of these devices is important with respect to both convenience and cost efficiency. Electrical receptacles and communication ports for supplying power and communication signals to various types of devices (lighting, computers, etc.) must be located in accessible positions for all types of use.

However, the cost of electrical materials rapidly increases as the number of power source receptacles and associated equipment is increased. In addition, and perhaps more importantly, the conventional design of single- or double-unit receptacles (for both electrical power and communications) within walls or floor surfaces, which are often a substantial distance from the devices to be powered or with which to communicate, cause unsightly and sometimes dangerous arrays, and may result in entanglements of the electrical cords and communications wires connected to the devices.

To overcome the problems associated with efficiency and convenience of electrical and communications outlet design, it is not uncommon to employ multiple receptacle raceways having a number of receptacles or communication ports with a common power source cord or communications cable plugged into a utility or commercial communications company=s outlet. Again, however, the raceways can result in unsightly and entangled arrays of electrical cords and communication lines. In addition, such raceways are often located on floor surfaces and are not particularly convenient.

It is also known to employ electrical receptacles and communications ports rigidly and directly mounted to various types of furniture, such as bookshelves and desks. These receptacles may be mounted at a location substantially above the floor surface, and allow the user to interconnect electrical and communications devices nearer their location of use, thereby avoiding the necessity of running device cords and cables a substantial distance. However, rigidly secured receptacles and communication ports must be mounted in a manner so that the user can readily insert device plugs and corresponding communication port connectors. Accordingly, these receptacles and communication ports are typically in a fairly Aopen @ location, and the device cords again may prove to be unsightly and space consuming. If, alternatively, the receptacles and communication ports are somewhat hidden from view, they can be difficult to access.

A system employing covered receptacles mounted within a work station is disclosed in Propst, U.S. Pat. No. 4,372,629 issued Feb. 8, 1983. The Propst et al. arrangement includes a desk top having a rear cover hinged to a vertical back panel. Receptacles are mounted to the lower portion of the cover and bristles extend horizontally from the cover to an edge of the desk top when the cover is closed. When the cover is open, the user can Aplug in @ the cord of a desired electrical device and close the cover, with the cord then extending through the bristles.

One relatively substantial advance over the prior art, relating to the mounting of electrical receptacles in a retractable manner in work surfaces and the like, is shown in the commonly owned Byrne, U.S. Pat. No. 4,551,577 issued Nov. 5, 1985. In the Byrne patent, a retractable power center includes a rectangular housing formed in the work surface, with a clamping arrangement to secure the housing to the work surface. A lower extrusion is connected to a lower portion of the housing, and a movable power carriage mounts receptacles. A catch assembly releasably maintains the carriage in a closed, retracted position. In response to manual activation, the catch assembly is released and springs tensioned between the carriage and the extrusion exert forces so as to extend the carriage upward into an extended open position. In the open position, the user can energize desired electrical devices from the receptacles, and then lower the carriage into the releasably secured, retracted position.

Although the foregoing Byrne patent represents a substantial advance with respect to retractable power centers mounted on work surfaces and the like, it can also be advantageous to employ a retractable power center having a relatively more simple construction. That is, the use of springs or similar arrangements can sometimes result in additional repair and maintenance costs. Further, the use of a relatively long extrusion and spring assemblies can also result in higher initial costs.

In this regard, a further advance over the prior art was achieved with the commonly owned Byrne, U.S. Pat. No. 4,747,788 issued May 31, 1988. In this patent, a retractable power center is disclosed which is manually operable. The power center includes a stationary upper housing received within a slot formed within a work surface, and a clamping arrangement to secure the housing to the work surface. A manually movable and vertically slidable power carriage is utilized to mount the electrical receptacles. In response to manually exerted forces, the carriage can be extended vertically upward into an open position. Small bosses extend laterally from the sides of the carriage to provide a means to support the carriage in its extended position, with the bosses resting on the top portion of the housing. Ledges are integrally formed on the lateral sides of the carriage near the bottom portions thereof, so as to prevent any additional movement of the carriage upwardly relative to the housing.

An example of a device having electrical receptacles, data ports and other types of communication outlets is disclosed in Brownlie et al., U.S. Pat. No. 4,984,982 issued Jan. 15, 1991. The Brownlie et al. patent illustrates an access flooring module to be mounted in an opening provided in an access floor. The module is movable between open and closed positions, and recesses are provided so as to receive electrical components such as power sockets or signal sockets. Electrical isolation is provided between certain components. In an alternative embodiment, high tension and low tension cables are interconnected to the rear of a module. The high tension cable is secured through a hard wire bracket, with the low tension cable secured through a data bracket. Cable ties are utilized to secure the cables to the rear of the module.

A device comprising both electrical power and data service lines, and specifically directed to use in a work surface, is disclosed in Timmerman, U.S. Pat. No. 5,575,668 issued Nov. 19, 1996. In the Timmerman patent, a temporary power/data tap is provided for delivering both electrical power and data service to a work surface from a distant standard wall or floor mounted electrical receptacle and data port. The power/data tap is movable between retracted and extended positions. The Timmerman patent illustrates a temporary power/data tap comprising an enclosure assembly, power distribution assembly, at least one outlet enclosure and a power cord. The enclosure assembly comprises a box structure having a top opening with two side surfaces and two removable end surfaces. The side surfaces include spot welded nuts on their inside surfaces for mounting the enclosure assembly to a work surface. The inside surface of the side surfaces of the box structure include rivets intruding into non-conductor space and serving as positive stops for the outlet enclosure housed therein. The end surfaces can also have openings for receiving a strain relief bushing or an electrical connector.

Disposed inside the enclosure assembly is a power distribution assembly for receiving and distributing electrical power through the enclosure assembly to the outlet enclosure. The power distribution assembly is an I-shaped structure comprising a first junction box and a second junction box. Each of the junction boxes includes a recessed central area with two centrally located conduit holes manufactured thereon which are used to attach one end of a metallic rigid conduit and one end of a metallic flexible conduit. Trade holes are also manufactured on the inside surface near the upper edge of each junction box, for engaging bullet catches located on lateral sides of each outlet enclosure for purposes of limiting the upper rotation of the outlet enclosure from the enclosure assembly.

During assembly, the power distribution assembly is disposed inside the enclosure assembly over a bottom surface so that a rigid conduit is parallel with the longitudinal axis of the enclosure assembly, with the junction boxes disposed on opposite sides thereof. This concept is shown in FIG. 5 of the Timmerman patent. Electrical power is delivered to the enclosure assembly from a standard receptacle by means of a power cord. The power cord extends through a bushing attached to the side surface of the box structure.

In the embodiment shown in FIGS. 1 and 2 of Timmerman, two outlet enclosures are placed through the top opening and disposed in a side-by-side manner inside the enclosure assembly. A hinge is disposed between the two outlet enclosures or between one outlet enclosure and the enclosure assembly, thereby enabling the outlet enclosures to freely pivot inside the enclosure assembly. Each outlet enclosure is made of sheet metal and comprises a cover and a box member divided by a partition into first and second compartments. The cover is connected along its back edge by a full length hinge to the top surface of the box member. A connecting rod is used to interconnect the hinge element on the cover with the hinge elements located on an adjacent outlet enclosure or on the enclosure assembly. The box member is divided into a first compartment used to house high voltage electrical connections, and a second compartment used to house low voltage electrical connections, such as data service line connections. Each end of the box member is fitted with a bullet cache which engages trade holes manufactured on the sides of the adjacent junction box to limit the upward rotation of the outlet enclosure.

Manufactured on a front surface of the box member are cutouts for receiving the electrical power receptacle and the data port. Manufactured on the bottom surface of the box member directly under the first compartment is an opening which enables a flexible conduit to be attached to the box structure. Attached over a rear opening of the box member is a removable cover. The cover fully encloses the first compartment and partially encloses the rear opening of the second compartment, thereby providing a means for the data service line to enter the second compartment.

To mount the temporary tap to a work surface, a suitable opening is manufactured on the work surface slightly larger than the box structure. Mounting brackets are utilized to attach the box structure to the work surface. In general, the Timmerman patent shows the concept of a power center pivotable between open and closed positions, with the power center having both an electrical receptacle and a data port mounted in separate and isolated compartments.

Another device comprising utility receptacles and specifically directed to use in a work surface is disclosed in Gevaert et al., U.S. Pat. No. 5,709,156 issued Jan. 20, 1998. In the Gevaert et al. patent, a utility receptacle assembly comprises a base mountable to a work surface and a utility receptacle pivotably and removably mounted to the base. With reference to FIGS. 1 and 2, the utility receptacle assembly is mounted within a support surface. The assembly includes a base member, receptacle member and cover member. FIG. 1 illustrates the utility receptacle assembly in a closed and inoperative position. FIG. 2 illustrates the receptacle assembly in an open and operative position.

With reference to FIGS. 2 and 3, the base member includes an upper wall, end walls and a pair of side walls. The end walls and side walls extend downwardly from the underside of the upper wall. The base member is mounted to the support surface within an opening formed in the support surface. Locking members on the base member have a series of locking tabs at their lower portions, which engage the lower surface of the support surface when the base member is assembled within the opening of the support surface. The base member includes a central passage and a pair of side recesses located on each side of the central passage. The central passage extends fully through the base member, and the recesses face upwardly within the base member. The side recesses are formed by bottom sections, each having a rectangular passage defined by side walls and end walls. The end walls have central recesses which can receive locking ears of a conventional communication receptacle.

The utility receptacle member, with reference to FIGS. 2 and 3, includes a pair of side walls, rear wall and stepped front wall construction having an upper wall section, lower wall section and receptacle face extending therebetween. A finger notch is formed in the upper wall section, and conventional electrical receptacle slots are formed in the receptacle face for receiving electrical plug-type connectors. The receptacle face is substantially perpendicular to the lower wall section, and a series of internal walls extend perpendicularly to the receptacle face into an internal cavity. An upwardly-facing opening is formed in the rear wall. The opening is U-shaped in configuration, and communicates with the internal cavity.

With specific reference to FIGS. 4 and 5, an electrical cable extends through the upwardly-facing opening and into the internal cavity. The cable is conventional in its construction, and provides power through its series of wires. For purposes of interconnection, and with reference to FIG. 3, the side walls include openings located toward upper and rear corners of each side wall. A retainer member is formed integrally with each of the side walls. The retainer member is resilient and flexible, and is defined by a slot, with a foot formed at the end.

Continuing with reference to FIG. 3, the cover member is engageable with the upper end of the utility receptacle member. The cover member includes a planar wall having an extension and a finger notch. A series of triangular retainer bosses extend from the lower surface of the planar wall. The retainer bosses are oriented so as to angle downwardly in a rearward direction. The cover member is mounted to the receptacle member, so that the lower surface of the planar wall abuts the upper ends of the receptacle member side walls, rear wall and upper wall section. A cable-locking strain relief tab is inserted into the upwardly-facing opening and is utilized with other elements to prevent relative movement between the electrical cable and the assembly defined by the cover member and the utility receptacle member. The cover member is defined as being securable to the utility receptacle member in any satisfactory arrangement, but preferably sonic-welded to provide a permanent bond.

For purposes of engagement and disengagement of the utility receptacle member with the base member, FIG. 9 illustrates the relative positions of one of the resilient fingers, in solid-line and phantom-line format. The utility receptacle member can be inserted into the central passage, with the member side walls of the utility receptacle member having a relatively close tolerance relative to the central passage transverse walls. The user can then press outwardly on the fingers so as to move the protrusions to a flush or recessed position relative to the transverse walls. The utility receptacle member can then be slid rearwardly so that transverse openings or holes within the utility receptacle member are in alignment with the protrusions of the fingers. The resiliency of the fingers will then cause the fingers to return to an engagement position, in which the fingers are co-planar with their respective traverse side walls, and the protrusions extend into the traverse openings. In this manner, the utility receptacle member is pivotably and removably mounted to the base member. For purposes of removal, the user can manually depress the fingers so as to disengage the protrusions from the transverse openings. Simultaneously, the user can apply an outward force to the utility receptacle member, so as to withdraw the receptacle member upwardly out of the central passage for removal from the base.

With respect to specific operation, the cover member can first be secured to the utility receptacle member. The utility receptacle member is then pivotably mounted to the base member. The pivotable mounting occurs through the protrusions of the fingers associated with the transverse walls engaging with previously described openings in the side walls of the utility receptacle member. The base member is then secured to the support surface, through the previously described locking members and locking tabs. With the pivotable movement of the utility receptacle member, the user has access to electrical power receptacles on the receptacle face and/or within the communication recesses. For purposes of access, the user will insert his/her finger into the previously described finger notch, located in an upper wall section of the receptacle member. This finger notch is located below the cover member finger notch associated with the cover.

The user can then lift upwardly on the finger notch of the cover, resulting in pivoting movement of the utility receptacle member and the cover member, with movement of the same to the open or accessible position illustrated in FIGS. 2 and 6. With the receptacle member moved to its open or accessible position, a pair of feet located on either side of the utility receptacle member and their associated tabs engage portions of the inner, transverse side walls of the base member, below forwardly projecting retainer surfaces of the base member. Once the ends of the feet have cleared the retainer surfaces, resiliency of the retainer tabs move the associated feet outwardly, so that the outer portions of the feet overlie and engage the retainer surfaces. This concept is shown in solid line format in FIG. 9 of the Gevaert et al. patent. In this manner, the utility receptacle member is maintained in an open or operative position.

With further reference to FIG. 2, any further rearward pivoting movement of the utility receptacle member is prevented by engagement of lower, outer sections of the cover member with the upper surface of the base member upper wall. With the utility receptacle member and cover member moved to the open position, access is provided to the side recesses and the communications receptacles mounted therein. Also, the user can then insert one or more power plugs into the power receptacle face. Correspondingly, one or more communication cables can be operatively engaged with the communication receptacles secured to recessed bottom sections of the base member.

To return the utility receptacle member to the closed position (illustrated in FIG. 1 of the Gevaert et al. patent), the user can manually engage the retainer tabs on opposing sides of the receptacle member, and press the tabs inwardly towards each other so as to move the feet associated with each tab out of alignment with the retainer surfaces. In this manner, the utility receptacle member may be pivoted back to its closed or inoperative position. In the closed or inoperative position, portions of the cover extending from the sides of the receptacle member overlie the base member recesses, thereby preventing access to the recesses and the communication receptacles mounted therein.

Although the aforedescribed devices provide various advantageous configurations relating to the use of electrical receptacles and data ports at a work surface level, it would also be advantageous to provide other concepts with these types of devices, particularly ones where such concepts can be provided in combination. For example, it may be advantageous to provide use of electrical receptacles and data ports, even when the device is in a fully closed or retracted position. That is, it can be contemplated to provide the capability of continuing engagement of electrical devices with the electrical receptacles (and communications devices with the data ports), even when the device is retracted. In addition, for various reasons, including aesthetic purposes, it may be advantageous to somewhat Ahide@ recessed areas of the devices, even when the devices are in an open or Aextended position. Still further, it may be advantageous to provide the capability of Ahiding@ or storing excess cord length of electrical or communications utility devices, when such utility equipment is engaged with the electrical receptacles and data ports.

BRIEF DESCRIPTION OF THE DRAWING

The invention will now be described with reference to the drawing, in which:

FIG. 7 is a partial, enlarged view of the corresponding identified portion of FIG. 5, showing one of the coupling connectors of the stationary housing, utilized to secure the stationary housing to the work surface;

FIG. 7A is a sectional, plan view of the coupling connector illustrated in FIG. 7, taken along lines 7A-7A of FIG. 7;

FIG. 7B is a sectional, plan view of the coupling connector illustrated in FIG. 7, taken along lines 7B-7B of FIG. 7, but is limited to a view of only the bushing of the coupling connector;

FIG. 8 is a sectional, plan view of the coupling connector illustrated in FIG. 7, taken along lines 8-8 of FIG. 7 and illustrating (in solid-line format) the coupling connector in a position which allows removal of the stationary housing from the work surface;

FIG. 9 is a sectional, plan view of the coupling connector of FIG. 7, similar to the illustration of FIG. 8, but instead showing the coupling connector in its locked position (in solid-line format), whereby the stationary housing is secured to the work surface;

DESCRIPTION OF THE PREFERRED EMBODIMENT

Figure 1:
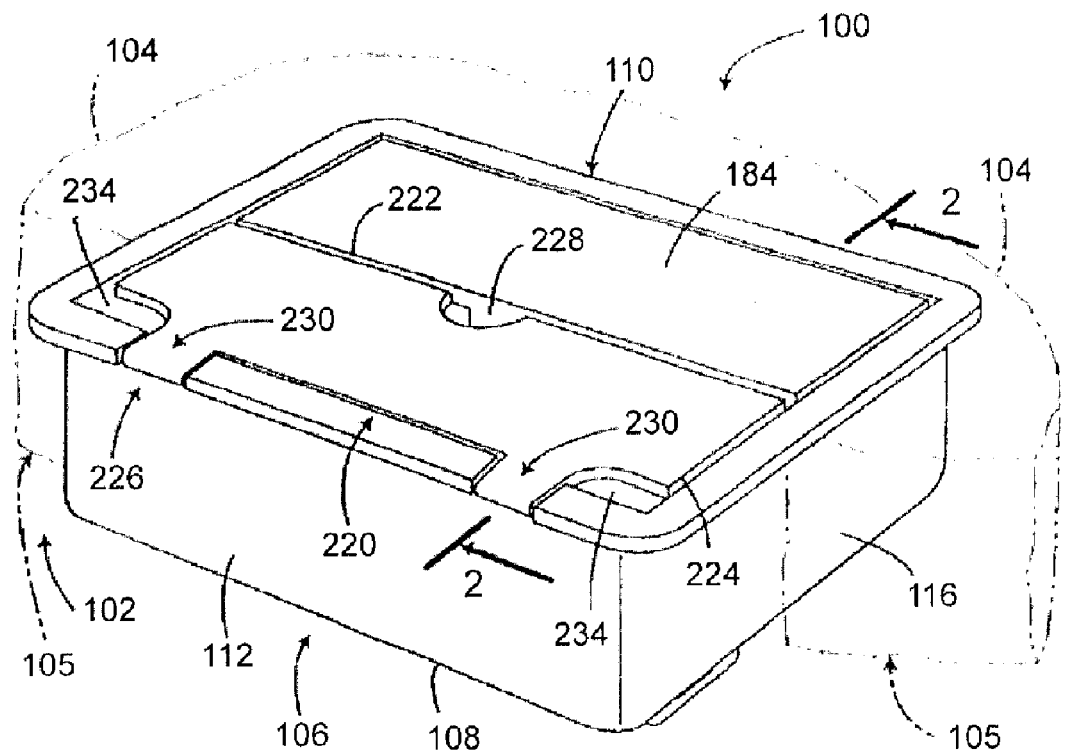
FIG. 1 is a perspective view of an embodiment of a prior art rotatable power and data center with storage area in accordance with the invention, with the rotatable power and data center illustrated in a closed, retracted position, and with a portion of an associated work station surface shown partially broken away, in phantom line format.

The principles of the invention are disclosed, by way of example, in an expandable power and data center shown in two embodiments of expandable power and data centers as illustrated in FIGS. 18-38. More specifically, certain of FIGS. 18-38 illustrate an embodiment referred to herein as an expandable power and data center 300. Others of the drawings of FIGS. 18-38 illustrate a second embodiment of a power data center in accordance with the invention, referred to as an expandable power and data center 500. The expandable power and data centers 300, 500 in accordance with the invention provide several advantages over known assemblies. Expandable power and data centers in accordance with the invention comprise means for mounting to elements such as planer work surfaces, vertical side surfaces, movable walls, or other types of comparable elements. In this regard, the expandable power and data centers in accordance with the invention are adapted for use with multiple types of mounts or mounting brackets. Further, the expandable power and data centers in accordance with the invention are adapted to support variable numbers of electrical devices (such as power receptacles) and various numbers of communication devices (such as data ports) and the like.

To more completely describe prior art associated with power and data centers, the following paragraphs describe an embodiment of a rotatable power and data center with storage area 100 as illustrated in FIGS. 1-17. This prior art power and data center 100 is disclosed in Byrne, U.S. Pat. No. 6,290,518 B1 issued Sep. 18, 2001. Following the description of the prior art power and data center 100 as illustrated in FIGS. 1-17, the expandable power and data centers 300, 500 are described herein with respect to FIGS. 18-38.

The power and data center with storage area 100 provides for access, work surface level, to electrical power, voice/data signals and other types of electrical and/or communications input/output. The power and data center 100 is adapted to be maintained in a closed, retracted position, while still retaining the capability of interconnection of electrical and communication devices. In addition, the power and data center 100 is adapted to facilitate interconnection of electrical and communication lines when a rotatable carriage of the power and data center 100 is moved to an open, extended position. Advantageously, the positioning of the rotatable carriage while in the open, extended position and the positional and structural relationship of components of the power and data center 100 serve to facilitate interconnection of electrical and communication lines, through providing a relatively Alarge@ and Aopen@ access area.

The power and data center includes a carriage which can be readily assembled and disassembled from other components of the rotatable power and data center, without any substantial complexity or the need for any specific tools. In addition, and as earlier mentioned, the relationship of various components of the rotatable power and data center serves to facilitate interconnection of electrical and communication lines through providing a relatively Aopen@ access area when the power and data center is in an open, extended position. In addition, with the configuration of a rotatable power and data center in accordance with the invention, a relatively large Astorage@ area is provided within a stationary housing of the power and data center, without the storage area being limited in depth by any elements of the power and data center. The relatively large and deep storage area facilitates the storing of wire or cable excess.

In accordance with another aspect of the rotatable power and data center 100, the power and data center facilitates use of electrical receptacles and communication ports, even when the power and data center is in a closed, retracted position. Still further, with respect to the depth of the power and data center, it can be constructed with a relatively Athin@ sectional profile or depth. That is, there is no need to require a housing or carriage to extend below the bottom portion of a work surface. Accordingly, users are not subjected to a loss of leg room or potential injury from structural elements projecting downward below the bottom of the work surface. In brief summary, the rotatable power and data center 100 in accordance with the invention primarily facilitates use of electrical receptacles and communication ports, even when the power and data center is in a closed, retracted position. In addition, the overall structure of the power and data center 100 facilitates a storage area for storing wire or cable excess.

More specifically, with reference to the drawings, the power and data center 100 as illustrated in FIG. 1 is adapted to be mounted within a slot or opening, such as the slot 102 formed within a furniture component. The furniture component may include, for example, a work surface such as the work surface 104 which is partially depicted in Acut-out@ format in FIGS. 1-5. Work surface 104 can, for example, be the working surface of a desk or similar furniture component. Although not specifically shown in the drawings, the slot 102 may be rectangular or of a similar shape, for purposes of appropriately fitting and securing the power and data center 100.

The power and data center 100, as particularly shown in FIGS. 1-5, includes a stationary housing 106, which may comprise a rectangular sleeve 108 and a horizontal flange or lip 110. The rectangular sleeve 108 will be of a sufficient depth so as to appropriately cover and protect the electrical and communication components as described in subsequent paragraphs herein. However, in accordance with the invention, the rectangular sleeve 108 advantageously may have a depth which is less than the depth of the work surface 104. That is, a bottom 105 of the work surface 104 will extend below the bottom of the rectangular sleeve 108. This thin Aprofile@ or short depth of the rectangular sleeve 108 (and the fact that other components of the power and data center 100 do not need to extend below the bottom of the rectangular sleeve 108) advantageously provides additional leg room to the user and does not subject the user to potential injury or other problems associated with structural elements of the power and data center 100 extending below the bottom of the work surface 104. The rectangular sleeve 108 is vertically disposed and includes a frontal wall 112 and two opposing vertical side walls 114, 116. The rectangular sleeve 108 also includes a rear vertical wall 118, with the front wall 112, side walls 114, 116 and rear vertical wall 118 integrally or otherwise connected together with appropriate means. These walls 112, 114, 116 and 118 form a rectangular box or sleeve-like structure 108 for protecting the electrical and communication components associated with the power and data center 100.

Integral with or otherwise appropriately connected to the rectangular sleeve 108 is the horizontal flange or lip 110. As shown primarily in FIG. 1, the horizontal flange or lip 110 is also rectangular in shape and should be of an appropriate size so as to provide support on the work surface 104 for the power and data center 100 within the slot 102. The rectangular sleeve 108 may be appropriately sized and the power and data center 100 may be configured so that the flange or lip 110 is supported on the upper portion of the work surface 104, when the stationary housing 106 is workably positioned within the slot 102. Although the horizontal flange or lip 110 provides a relatively secure supporting relationship for the stationary housing 106 with the work surface 104, additional means can be provided for more rigidly securing the power and data center 100 to the work surface 104. One example of such a connecting arrangement in accordance with the invention is described in subsequent paragraphs herein.

Figure 5:
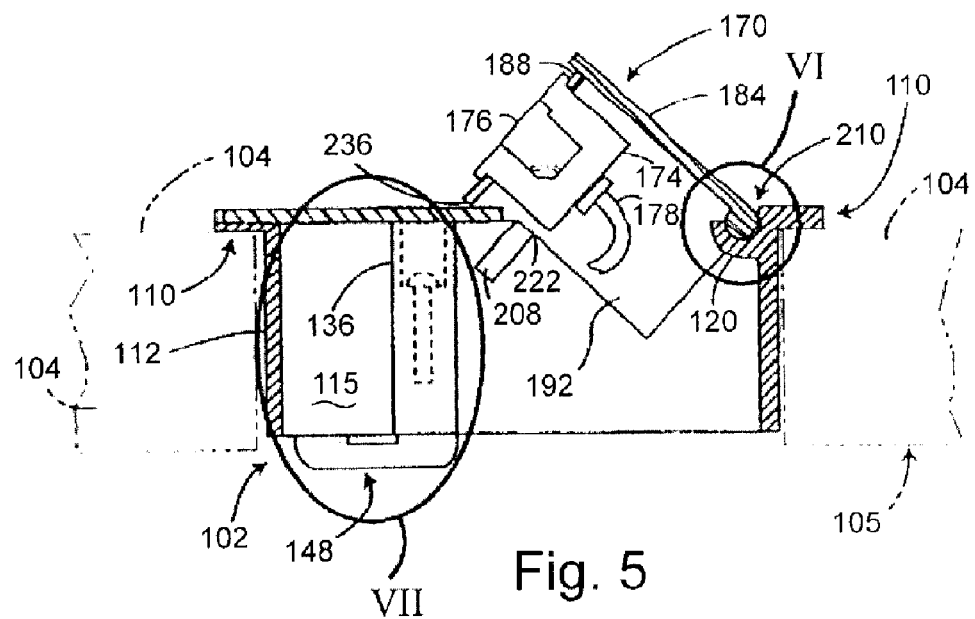
FIG. 5 is a sectional, end view of the rotatable power and data center, taken along lines 5-5 of FIG. 4.
Figure 6:
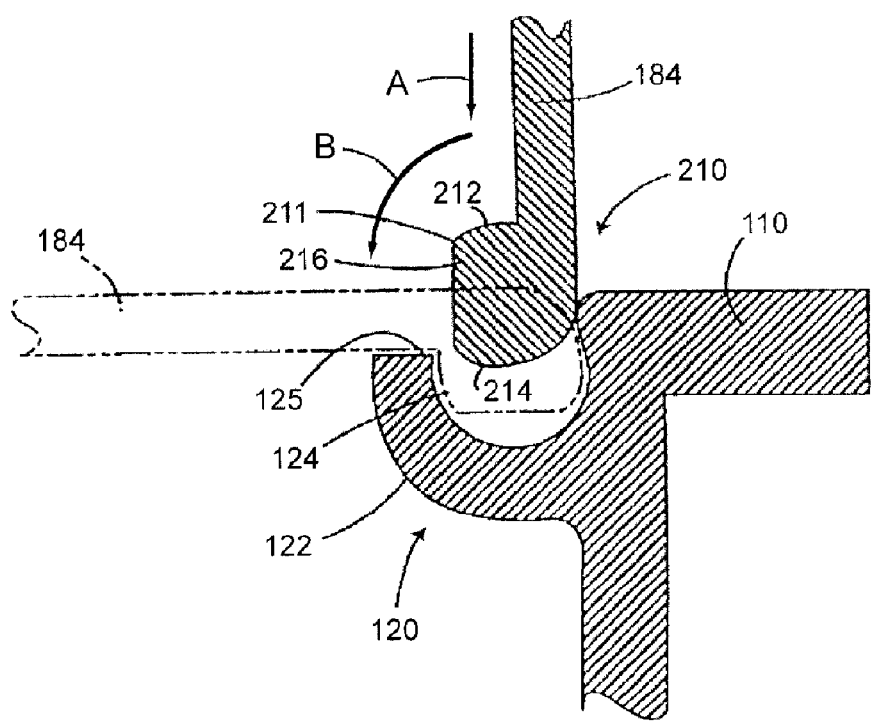
FIG. 6 is a partial, enlarged view of the corresponding identified portion of FIG. 5, showing the releasable coupling of the carriage of the rotatable power and data center with a rear portion of a stationary housing of the power and data center.
Figure 11:
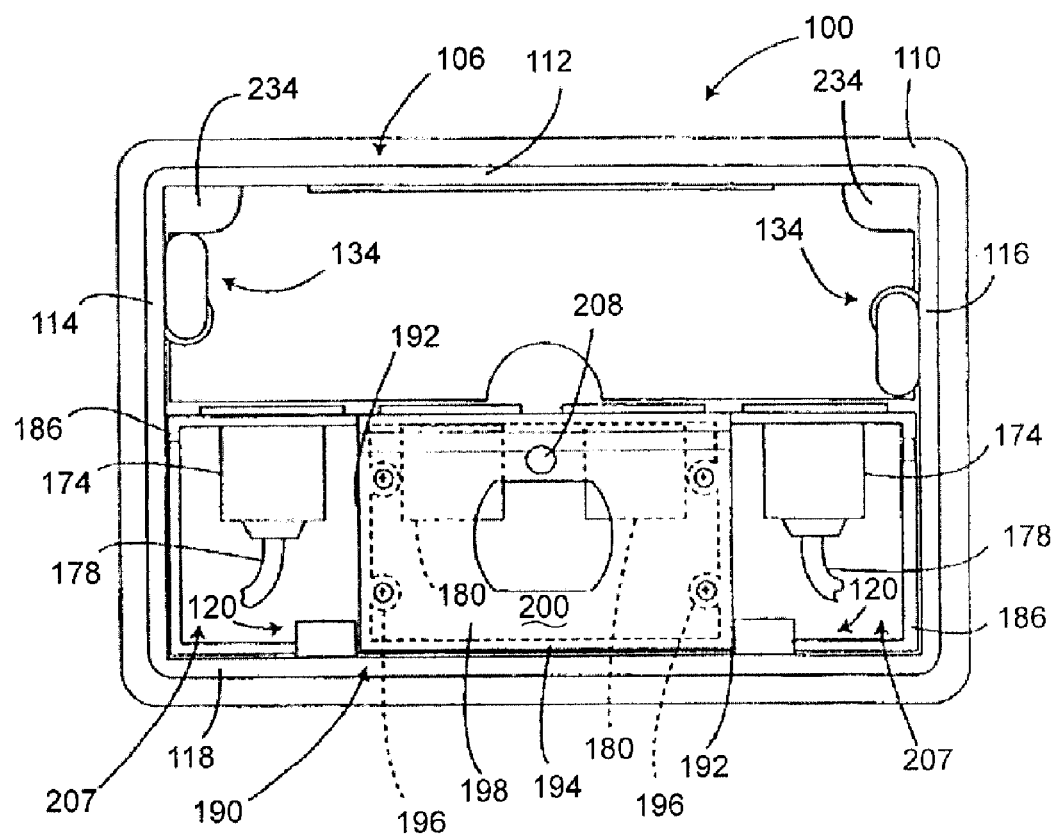
FIG. 11 is an underside view of the rotatable power and data center, with the cover and the carriage shown in a closed, retracted position.
Figure 12:
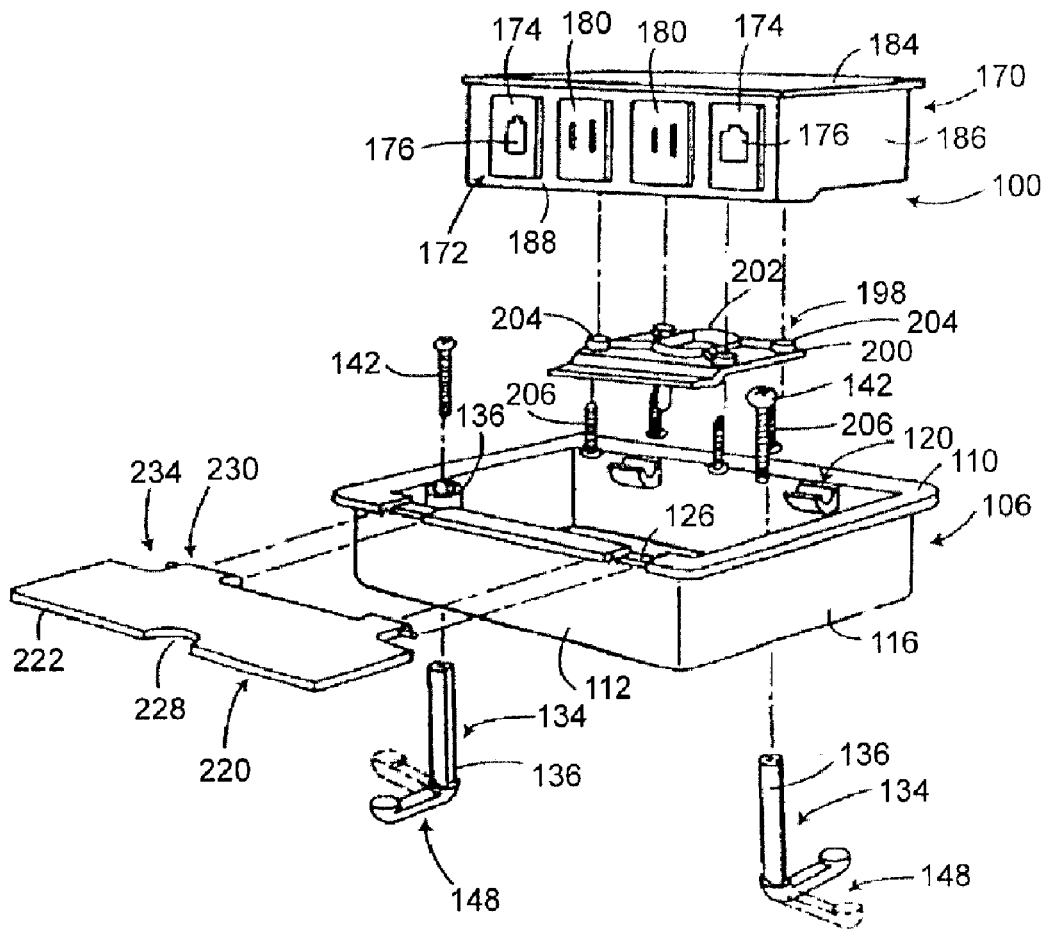
FIG. 12 is an exploded, perspective view of the rotatable power and data center illustrated in FIG. 1, showing the structural relationship between the carriage, cover, stationary housing, coupling connectors and interconnecting means for connecting together various elements of the rotatable power and data center.

With reference primarily to FIGS. 2, 5, 6, 11 and 12, the stationary housing 106 also includes a pair of carriage pivot flanges 120 positioned on an inner portion of the rear vertical wall 118, as primarily shown in FIG. 12. Each carriage pivot flange 120 is integral with or otherwise appropriately secured to an inner surface of the rear vertical wall 118. As shown primarily in FIG. 6, with respect to one of the pivot flanges 120, each pivot flange 120 includes an arcuate portion 122 which forms, with the rear vertical wall 118, a substantially U-shaped channel 124. However, the arcuate portion 122 includes a channel edge 125 which extends Abeyond@ a vertically disposed position (as viewed in FIG. 6) which would exist with a channel 124 which is Aexactly@ U-shaped. That is, the radius and arc of the arcuate portion 122 extends greater than 180E, which would exist with a channel of exact U-shaped proportions. With the edge 125 extending as illustrated in FIG. 6, the arcuate portion 122 and the radius of the formed U-shaped channel 124 may be appropriately sized so as to provide suitable positioning and rotation of a carriage portion of the power and data center 100 as described in subsequent paragraphs herein. As also described in subsequent paragraphs, the sizing and shape of the carriage pivot flange 120 provides a means for securing a carriage to the stationary housing 106, while correspondingly facilitating removal of the carriage from its releasable interconnection with the stationary housing 106, when the carriage is in a specific orientation.

Figures 3, 4:
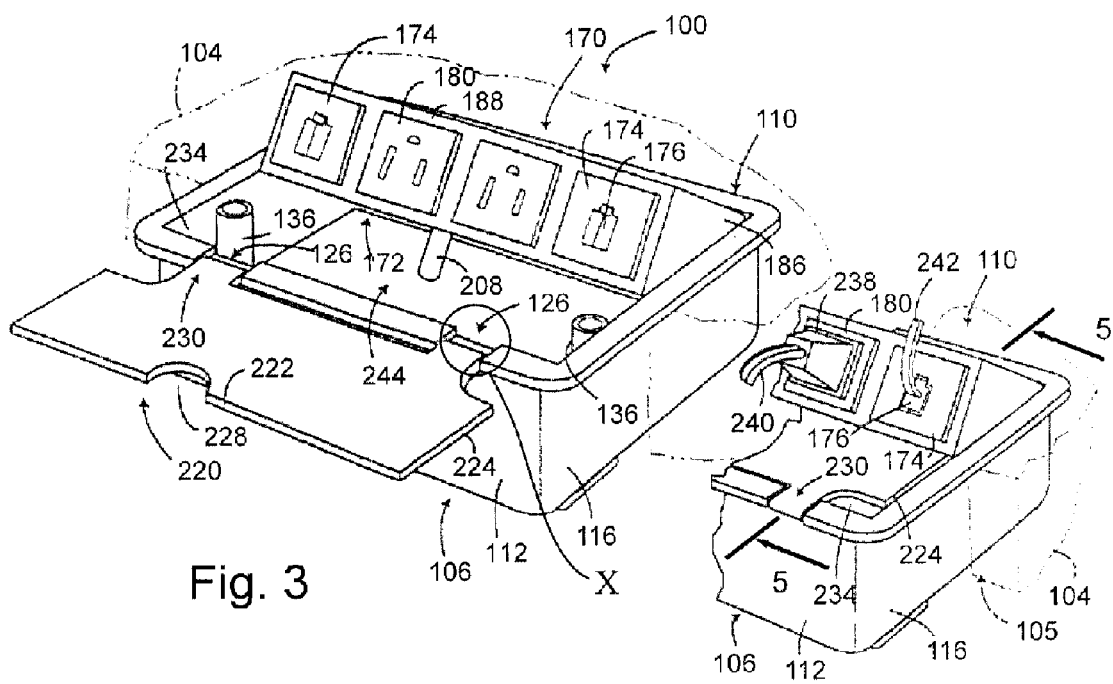
FIG. 3 is a perspective view of the rotatable power and data center illustrated in FIG. 1, with the carriage of the power and data center in an open position to illustrate various elements thereof, and with the cover illustrated in its 180E position.
FIG. 4 is a partial, perspective view (in a somewhat enlarged format) of a portion of the rotatable power and data center, with the power and data center in an open, extended position, the cover returned to its closed position and interconnection of an electrical plug-type cord and communication line to an electrical receptacle and data port, respectively, of the power and data center.
Figure 10:
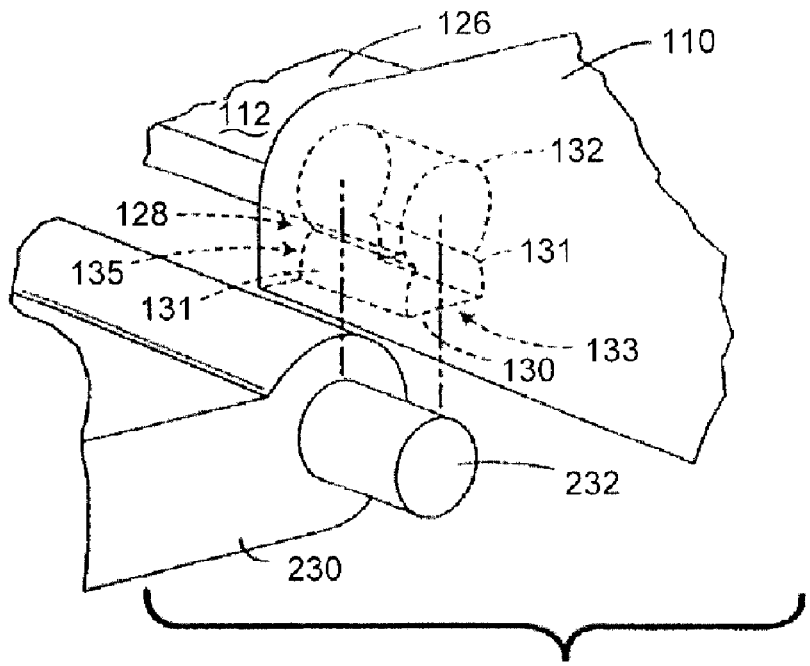
FIG. 10 is a partial, enlarged and exploded view of the corresponding identified portion of FIG. 3, showing elements associated with pivotable and releasable interconnection of the cover with the stationary housing.

With reference to FIGS. 3, 10 and 12, the horizontal flange or lip 110 of the stationary housing 106 also includes a pair of appropriately sized cut-outs or connecting slots 126, each spaced above the front wall 112 an equal distance from associated side walls 114, 116. With reference particularly to FIG. 10, the horizontal flange or lip 110 also includes a pair of cover connecting chambers 128, each formed in opposition to the other adjacent a corresponding one of the cut-outs or connecting slots 126. In FIG. 10, only one of the cover connecting chambers 128 is shown, specifically the cover connecting chamber 128 associated with the specifically identified connecting slot 126 illustrated in FIG. 3 and positioned to the right of the specifically identified connecting slot 126. The other cover connecting chamber 128 is located in an opposing configuration to the specific cover connecting chamber 128 shown in FIG. 10, and is a mirror image thereof. Both of the cover connecting chambers 128 associated with the specifically identified connecting slot 126 illustrated in FIG. 3 and FIG. 10 are shown in hidden-line format in FIG. 10B. With reference to the cover connecting chamber 128 shown in FIG. 10, the chamber 128 includes a lower bore 130 having three sides which form a substantially box-like configuration. The lower bore 130 includes a pair of opposing side walls 131. The bore 130 also includes an opening 133 at a lower portion having a rectangular-shaped configuration, with a width sufficient so as to insert a pivot mandrel 232 also shown in FIG. 10 and described in subsequent paragraphs herein. Further, the lower bore 130 also includes an opening 135 at its forward position, again so as to allow insertion of the pivot mandrel 232. At its top portion, the lower bore 130 opens to a substantially cylindrical aperture 132 positioned immediately above the lower bore 130 within the horizontal flange or lip 110. The diameter of the substantially cylindrical aperture 132 is also sufficient so as to receive a corresponding one of the pivot mandrels 232. As described in subsequent paragraphs herein, the pivot mandrels 232 and the cover connecting chambers 128 provide a means for removably securing a cover 220 of the power and data center 100 to the stationary housing 106.

With reference primarily to FIGS. 2, 5, 7-9 and 12, the stationary housing 106 includes a pair of coupling connectors 134 associated therewith. The coupling connectors 134 are utilized to removably secure the stationary housing 106 of the power and data center 100 to the work surface 104. More specifically, each of the coupling connectors 134 includes a cylindrical bushing 136 which is vertically oriented and integrally coupled with or otherwise secured to the stationary housing 106. One of the bushings 136 is located on an inner surface 115 of side wall 114, while the other bushing 136 is located in an opposing configuration on an inner surface of the other side wall 116. For purposes of brevity, the structural configuration of only one of the coupling connectors 134 will be described, it being understood that the configuration of the other coupling connector 134 is substantially identical.

Within each of the bushings 136 is a vertically disposed cylindrical aperture 138. The cylindrical aperture 138 includes a first cylindrical portion 140 having a diameter sufficient so as to receive the head 143 of a threaded screw 142, in a counter-sunk configuration. That is, the longitudinal length of the first cylindrical portion 140 allows for the threaded screw 142 to be positioned so that the head 143 is below the top of the bushing 136 when the threaded screw 142 is assembled with the coupling connector 134. The cylindrical aperture 138 further includes a second cylindrical portion 144 having a diameter as primarily shown in FIG. 7A. At the lower portion of the cylindrical aperture 138, the aperture 138 includes a third substantially cylindrical portion 145, with a diameter substantially larger than the diameter of the threaded second cylindrical portion 144. A cross section of only the bushing 136, showing the third substantially cylindrical portion 145, is illustrated in FIG. 7B. As shown in FIG. 7B, although the portion 145 is substantially cylindrical in configuration, the inner surface of the bushing 136 (which forms the aperture 138) includes an arcuate-shaped detent 146 which acts so as to essentially narrow the diameter of the third substantially cylindrical portion 145 within an arc of the maximum, circular cross-sectional area of the cylindrical portion 145 as illustrated in FIG. 7B.

The coupling connector 134 further comprises a coupler 148 having an upstanding sleeve portion 150 and a horizontally disposed foot 152 integrally formed with or otherwise secured to the lower end of the upstanding sleeve portion 150. As primarily illustrated in FIGS. 8, 9 and 12, the upstanding sleeve portion 150 is formed of a substantially cylindrical portion 154 having an arcuate-shaped sill 156, with a cross-sectional configuration as primarily shown in FIGS. 8 and 9. The sill 156 is preferably integrally formed with the substantially cylindrical portion 154 of the upstanding sleeve portion 150. As described in subsequent paragraphs herein with respect to operation of the coupling connectors 134, the arcuate-shaped sill 156 is adapted to abut the arcuate-shaped detent 146 of the bushing 146 when the stationary housing 106 is secured to the work surface 104. A threaded aperture 158 extends at least partially longitudinally through the upstanding sleeve portion 150. The threaded aperture 158 is adapted to threadably receive the connecting screw 142. The foot 152 includes a leg 160 extending from the underside of the upstanding sleeve portion 150. A boss 162 projects upwardly from the distal section of the leg 160.

The operation of the coupling connectors 134 in removably securing the stationary housing 106 and associated power and data center 100 to the work surface 104 will now be described. Each of the couplers 148 is first inserted from the underside of stationary housing 106 (as shown in FIG. 12) into a corresponding one of the bushings 136. More specifically, the upstanding sleeve portion 150 is inserted into the third substantially cylindrical portion 145, so that the substantially cylindrical portion 154 and arcuate-shaped sill 156 are received within the third substantially cylindrical portion 145. The relative sizes of the bushings 136 and the couplers 148 are such that the sills 156 of the upstanding sleeve portions 150 are positioned relative to the detents 146 of the bushings 136 so as to appropriately cooperate with the same to allow insertion of the substantially cylindrical portions 154 and sills 156 into the third substantially cylindrical portion 145 of the bushings 136. The connecting screws 142 are then inserted into the first cylindrical portions 140 of the bushings 136 from above the stationary housing 106, and threadably secured within the threaded apertures 158 of the upstanding sleeve portions 150.

For purposes of then inserting the stationary housing 106 and the coupling connectors 134 into the slot 102 of the work surface 104, the couplers 148 are positioned as shown in FIGS. 7 and 8, and as further shown in solid-line format in FIG. 12, with the feet 152 positioned so that the legs 160 extend parallel to the side walls 114, 116 of the stationary housing 106. It is seen that for the legs 160 to be extended in this parallel configuration with the upstanding sleeve portions 150 inserted into the bushings 136, the detents 146 and arcuate-shaped sills 156 must be of a relative configuration to allow this specific positioning of the legs 150. Again, such relative positioning is illustrated in FIG. 8.

With this configuration, the rectangular sleeve 108 of the stationary housing 106 can be inserted into the slot 102 of work surface 104. After such insertion, the connecting screws 142 can each be turned clockwise (as viewed from above the stationary housing 106 and in the direction illustrated in FIGS. 8 and 9). With reference first to FIG. 8, as the connecting screw 142 is turned clockwise, it will correspondingly rotate the substantially cylindrical portion 154 of the upstanding sleeve portion 150. With this clockwise rotation, the substantially cylindrical portion 154 will continue to rotate until the sill 156 abuts one side of the corresponding detent 146 of the bushing 136. This abutment will then prevent any further clockwise and simultaneous rotational movement of the connecting screw 142 and threadably secured sleeve portion 150, relative to the corresponding bushing 136. With this clockwise rotation of connecting screw 142, the foot 152 will correspondingly rotate in a clockwise direction from its position as shown in FIG. 8 to the position shown in FIG. 9. At this position, with the detent 146 abutting the sill 156, further rotational movement of the sleeve 150 and leg 152 is prevented. Also, in this position, the boss 162 is located immediately beneath an underside of the work surface 104. Continued rotation of the connecting screw 142 will thereby cause upward movement of the upstanding sleeve portion 150 within the bushing 136. Such upward movement will also cause corresponding upward movement of the foot 152. This upward movement will continue until the boss 162 securely engages the underside portion of the work surface 104. In this manner, the stationary housing 106 can be readily secured within slot 102 of the work surface 104.

When it is desired to disassemble the power and data center 100, including removal of the stationary housing 106 from the slot 102 of work surface 104, the connecting screws 142 can be rotated in a counter-clockwise direction as seen from the top portion of the stationary housing 106 (and as also viewed in FIGS. 8 and 9). Such rotation of the connecting screws 142 will cause corresponding rotation of the upstanding sleeve portions 150, until the sills 156 of the sleeve portion 150 again abut opposing edges of the detents 146. This abutment is illustrated in FIG. 8, and the abutment prevents any further counter-clockwise rotation of the couplers 148. In this position, however, the legs 160 are correspondingly positioned under the stationary housing 106, substantially parallel to the side walls 114, 116 of the stationary housing 106, and away from the underside portion of the work surface 104. Further counter-clockwise, rotational movement of the connecting screws 142 will Aloosen@ the couplers 148 and allow the same to Adrop@ within the bushings 136 of stationary housing 106. Such movement will facilitate removal of the stationary housing 106 from the work surface 104.

It is to be understood that proper operation of the coupling connectors 134 will require proper sizing of various components, including relative sizes of the sills 156 and detents 146. For example, these elements must be properly sized so that the legs 160 are allowed rotational movement through an arc of approximately 90E, thereby allowing proper connection and disconnection of the feet 152 from the underside portion of the work surface 104. If, for example, rotational movement of greater than 180E was permitted through the relative sizing of the detents 146 and sills 156, the coupling connectors 134 would not properly operate.

One advantage of the use of the coupling connectors 134 will be apparent. Specifically, the coupling connectors 134 allow the stationary housing 106 to be rigidly (albeit removably) secured to the work surface 104, without requiring any Abulky@ or otherwise substantial structural elements extending below the underside portion of the work surface 104. Accordingly, connecting elements do not hamper the user=s leg room or otherwise subject the user to possible injury as a result of underhanging structure elements. Further, as earlier mentioned, it is advantageous for the stationary housing 106 to have a depth which is less than the depth of the work surface 104. Again, with the relatively Alow profile@ in depth of the stationary housing 104, the user=s leg room is not hampered by such underhanging structure. However, although the stationary housing 106 advantageously does not extend below the underside of the work surface 104, the coupling connectors 134 provide a means for rigidly and removably securing the stationary housing 106 to the work surface 104.

With respect to the lack of connecting elements hampering the user=s leg room or otherwise extending below the underside portion of work surface 104, the requisite positioning of the connecting screws 142 is particularly noted. As apparent from FIGS. 7, 8 and 9, the relative structure of the connecting screws 142, the threaded aperture 158 and the remaining portions of the upstanding sleeve portion 150 do not require the connecting screws to extend below the underside of the work surface 104. In view of this structure, the connecting screws do not present any impediment to the user=s leg room or otherwise subject the user to possible injury.

Turning to other aspects of the power and data center 100, the power and data center 100 also includes a manually operable and rotatable carriage 170. As shown in FIG. 3, the rotatable carriage 170 includes a component section 172 into which a selected number and type of electrical and communication components may be incorporated. These components may generally be assembled in any manner as desired by the purchaser of the power and data center 100. For example, and as shown primarily in FIG. 3, the component section 172 may include receptacle devices comprising voice/data or Acommunication@ receptacles 174 having data ports 176 for purposes of providing communications interfaces, such as conventional RS-232 communication connectors. The data ports 176 may be connected through conventional communications cables 178 (as partially shown in FIG. 11) to an incoming/outgoing conventional communications port located below the work surface 104 at the floor level or at any other conventional location. The incoming/outgoing communications port is not shown in the drawings. However, the concept of utilizing data ports, incoming/outgoing communications components and data service lines are shown, for example, in Timmerman, U.S. Pat. No. 5,575,668 issued Oct. 6, 1995.

Figure 14:
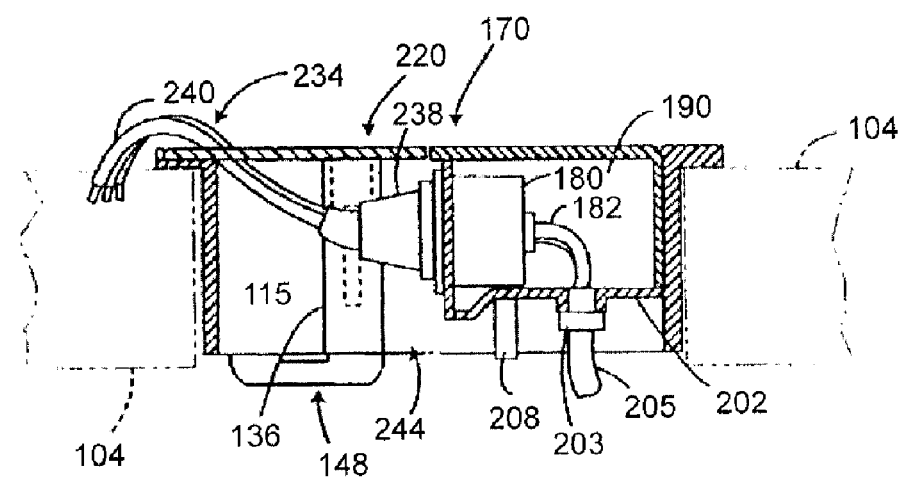
FIG. 14 is a sectional, end view of the rotatable power and data center, taken along lines 14-14 of FIG. 13.

As further shown in FIG. 3, the component section 172 may also include a series of conventional electrical receptacles 180 for supplying power to AC voltage office equipment or similar devices. The electrical receptacles 180 may be interconnected to conventional incoming power cables 182, as illustrated in FIG. 14. The incoming power cables 182 may be energized through interconnection at their distal ends to conventional incoming AC power outlets located at a floor surface or other area. The AC power outlets are not shown in the drawings.

In addition, the component section 172 may include other conventional electrical/communication devices, such as an on-off switch (not shown in the drawings) which may, if desired, be interconnected with other components of the component section 172 so as to provide a single location for energizing or deenergizing both high and low voltage power provided through the component section 172. Still further, if desired, a conventional circuit breaker (also not shown in the drawings) or similar device may be provided and appropriately interconnected for purposes of protection. In addition, a power surge protector (also not shown in the drawings) could be utilized within the component section 172 for purposes of providing protection for sensitive electronic communications equipment which may be energized and interconnected through the component section 172.

As earlier stated, interconnections of the communications cables 178 and incoming power cables 182 to the appropriate receptacles of the component section 172 are conventional in design and do not comprise any portions of the novel concepts of the invention. These types of interconnections are well known in the electrical and communications arts. For example, for purposes of appropriately guiding cables 178 and 182, cable clamps (not shown in the drawings) may be located to the rear of the component section 172 of carriage 170. One type of cable shielding and strain relief for the incoming power cables 182 will be described in subsequent paragraphs herein.

With reference primarily to FIGS. 1-6, 11, 12 and 14, the carriage 170 also includes a top portion 184 which is substantially rectangular in structure as expressly shown in FIG. 1. The carriage 170 also includes a pair of opposing side walls 186 and a substantially rectangular front portion 188. The front portion 188 essentially forms the area where the component section 172 is positioned.

With reference primarily to FIGS. 11 and 12, the carriage 170 may also include inner side walls 192 in an opposing configuration (as shown in FIG. 11), with a rear wall 194 extending therebetween. The inner side walls 192 may include threaded bushings 196, with a pair of the threaded bushings 196 integrally molded with or otherwise secured to an inside surface of each of the inner side walls 192. The threaded bushings 196 are vertically disposed. The middle of the front portion 188, inner side walls 192 and rear wall 194 essentially comprise a substantially rectangular and box-like protected compartment 190 within which the conventional electrical receptacles 180 may be positioned within the front portion 188 of the component section 172. For purposes of covering the underside of the protected compartment 190, a lower cover 198 may be employed as particularly shown in FIG. 12. As shown in FIGS. 11 and 12, the lower cover 198 may have a substantially planar portion 200 with a plug aperture 202 extending therethrough. The planar portion 200 also includes a series of four holes 204. When the lower cover 198 is appropriately positioned at the underside of the protected compartment 190, the holes 204 are coaxial with the threaded bushings 196 in the inner side walls 192. Connecting screws 206 are utilized to secure the lower cover 198 to the underside of the protected compartment 190.

For purposes of clarity, incoming power cables 182 are not shown in either FIG. 11 or FIG. 12. However, as shown in FIG. 14, the incoming power cables 182 may be extended through the plug aperture 202 to the conventional electrical receptacles 180. Also, for purposes of protection of the incoming power cables 182, a strain relief clamp or collar 203 may be coupled in a conventional manner to the exterior of the plug aperture 202 extending outwardly from the lower cover 198. In addition, the multiple incoming power cables 182 may be received within a single cable 205 which is connected to the strain relief collar 203 and which extends to a plug or other device (not shown in the drawings) connectable to an incoming power source (also not shown in the drawings). The configuration of the single cable 205, strain relief collar 203 and the like are relatively conventional in nature, and do not form any of the novel concepts of the invention.

With reference again to FIG. 11, sections of the top portion 184, front portion 188, opposing side walls 186 and inner side walls 192 form a pair of communication channels 207. The communication channels 207 form semi-protected areas where the data ports 176 and interconnected communications cables 178 may be located. However, as earlier described, various other arrangements for the component section 172 may be utilized. Accordingly, the channels 207 may include not only data ports 176, but may also include other electrical/communication receptacles and similar devices. Further, however, with the particular configuration illustrated in FIG. 11, the conventional electrical receptacles 180 and associated incoming power cables 182 are substantially shielded from the data ports 176 and associated communications cables 178. Accordingly, electrical isolation may be provided between the conventional electrical receptacles 180 and communications receptacles 174.

The carriage 170 also includes a projecting stub 208 which extends downwardly from the planar portion 200 of the lower cover 198, as shown in FIGS. 3, 11 and 12. The projecting stub 208 is utilized to assist the user in repositioning the carriage 170 during operation, as described in subsequent paragraphs herein.

Referring to FIGS. 5 and 6, extending rearwardly and downwardly from the top portion 184 of the carriage 170 are a pair of pivot tongues 210 positioned on each side of the rear wall 194 of the carriage 170, and equal distance from the side walls 114, 116. Only one of the pivot tongues 210 is illustrated in FIGS. 5 and 6. Each of the pivot tongues 210 has a cross-sectional configuration as expressly shown in FIGS. 2, 5 and 6. As specifically shown in an enlarged view in FIG. 6, the pivot tongue 210 is formed of a pair of arcuate sections 212 and 214 joined together by a flat section 216. The intersection of the arcuate section 212 and flat section 216 forms an edge 211 as referenced in FIG. 6. Each of the pivot tongues 210 is appropriately sized and configured on the carriage 170 so that each can be fitted into a corresponding one of the U-shaped channels 124 associated with the stationary housing 106.

As shown primarily in FIGS. 5 and 6, with the use of the flat section 216, and the particular shapes and configurations of the remainder of the pivot tongues 210 and the U-shaped channels 124, the pivot tongues 210 can be made to be fitted into the U-shaped channels 124 only when the pivot tongues 210 are substantially vertically disposed as illustrated in solid line format in FIG. 6. This particular configuration of the carriage 170 will be referred to herein as the Avertical orientation@ of the carriage 170. After the pivot tongues 210 have been inserted into the U-shaped channels 124 from the vertical orientation as shown in solid line format in FIG. 6 (and indicated by the arrow A in FIG. 6), the pivot tongues 210 can then be rotated counter-clockwise (as indicated by the arrow B in FIG. 6). The carriage 170 can be rotated counter-clockwise as shown in FIG. 6 until the top portion 184 is in a substantially horizontal plane, as shown in dotted line format in FIG. 6. When the top portion 184 and associated carriage 170 is in substantially any position other than one where the top portion 184 is vertically disposed (i.e. the vertical orientation of the carriage 170), the pivot tongues 210 are essentially Alocked@ within the U-shaped channels 124 of the stationary housing 106, in a manner such that the carriage 170 cannot be removed from this pivotal interconnection with the stationary housing 106. More specifically, with the carriage 170 in the orientation shown in dotted line format in FIG. 6, where the top portion 184 is in a substantially horizontal plane, or when the carriage 170 is in an Aopen@ position as illustrated in FIG. 5 (and described in subsequent paragraphs herein), the edge 211 of each of the pivot tongues 210 is prevented by the edge 125 of the U-shaped channel 124 from Arotating out of@ the U-shaped channel 124.

In accordance with the foregoing, the pivot tongues 210 and the U-shaped channel 124 provide a means for the carriage 170 to be readily assembled and disassembled from the stationary housing 106. Advantageously, removably securing the carriage 170 to the stationary housing 106 in accordance with the foregoing requires no tools.

With respect to other elements of the power and data center 100, and with reference primarily to FIGS. 1, 3, 10, 10A, 10B and 12, the center 100 also includes a cover 220 in a substantially rectangular configuration as particularly shown in FIGS. 1 and 3. The cover 220 includes a forward edge 222, side edges 224 and a coupling portion 226 which is located opposite from the forward edge 222. The forward edge 222 includes an opening comprising a finger notch 228 positioned equal distance from each of the side edges 224. The finger notch 228 is utilized to facilitate rotational movement of the cover 220 and carriage 170, relative to the stationary housing 106.

Positioned within the coupling portion 226 of the cover 220 is a pair of pivot arms 230, primarily shown in FIGS. 1 and 3 and positioned equal distance from the side edges 224. Integrally molded with or otherwise connected to each of the pivot arms 230 is a pair of pivot mandrels 232. As primarily shown in FIG. 10B, each of the pivot mandrels 232 extends outwardly from an opposing side of each of the corresponding pivot arms 230. It is to be understood that each of the pivot mandrels 232 associated with a particular one of the pivot arms 230 is essentially a mirror image of the other. The primary purpose of the pivot arms 230 and the pivot mandrels 232 is to provide a means for rotatable and removable interconnection of the cover 220 with the stationary housing 106.

Figure 10A:
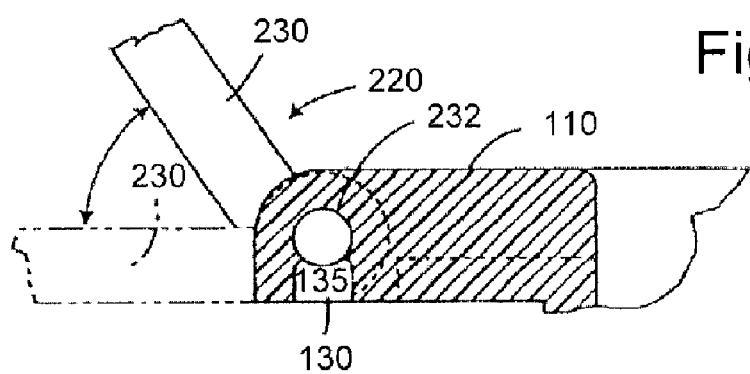
FIG. 10A is a sectional, end view of the interconnection elements illustrated in FIG. 10, showing the interconnection of one of the pivot mandrels of the cover with the stationary housing, when the cover is interconnected with the stationary housing.
Figure 10B:
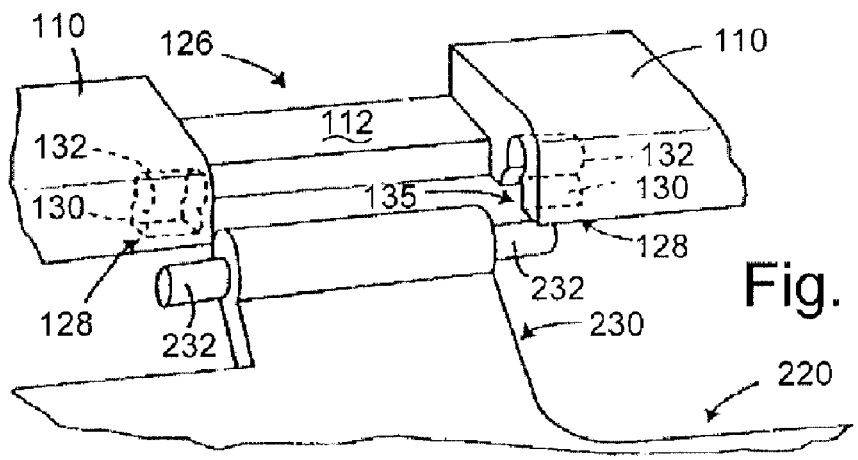
FIG. 10B is a partial, plan view of one of the pivot arms of the cover as illustrated in FIG. 10, showing the pair of pivot mandrels associated with the pivot arm and further showing the general, positional relationship of the pivot arm with the cover connecting slots during interconnection.

For purposes of interconnecting the cover 220 with the stationary housing 106, and with reference primarily to FIGS. 3, 10, 10A, 10B and 12, the cover 220 may first be positioned as shown in FIG. 3. For purposes of description, this particular configuration of cover 220 shown in FIGS. 3 and 12 is described herein as the A180E position.@ Also, it should be noted that for purposes of interconnecting the cover 220 with the stationary housing 106, the stationary housing 106 must be removed from the work surface 104. With the stationary housing 106 removed from the work surface 104, the cover 220 may be positioned as expressly shown in FIGS. 10 and 10B, with the pivot mandrels 232 located immediately below corresponding ones of the cover connecting chambers 128. After being located in this position, the cover 220 can be moved upwardly so that each of the pivot mandrels 232 associated with a pivot arm 230 is inserted into a corresponding one of the lower bores 130, illustrated in FIGS. 10 and 10B, and previously described herein with respect to the stationary housing 106. After being positioned therein, the pivot mandrels 232 may be forced upwardly, and the resiliency of the chambers 128 will allow the pivot mandrels 232 to be moved upwardly into the substantially cylindrical apertures 132. The position of the pivot mandrels 232 within the substantially cylindrical apertures 132 is illustrated in FIG. 10A. The size of the pivot mandrels 232, relative to the diameters of the substantially cylindrical apertures 132, will allow for relatively free rotational movement of the pivot mandrels 232 within the substantially cylindrical apertures 132, while still maintaining the mandrels 232 within the apertures 132.

To remove the cover 220 from the stationary housing 106, again the stationary housing 106 must be removed from the work surface 104. Thereafter, the user may manually push downward on the pivot arms 230 relative to the stationary housing 106, thereby forcing the pivot mandrels 232 out of the cylindrical apertures 132 and through the lower bores 130. In this manner, the pivot mandrels 232 can be removed from the chambers 128 and the cover 220 can be correspondingly removed from the stationary housing 106.

The positioning of the pivot mandrels 232 in the substantially cylindrical apertures 132 comprises the operative position for use of the cover 220 with the power and data center 100. With the stationary housing 106 then secured to the work surface 104, the cover 220 is free to rotate relative to the stationary housing 106 through the pivot mandrels 232. In the 180E position previously described herein, the cover 220 would essentially lay Aflat@ on the work surface 104.

The cover 220 also includes another important concept in accordance with one aspect of the invention. More specifically, the cover 220 includes a pair of cable passages 234 formed adjacent the coupling portion 226 and adjacent the side edges 224 of the cover 220, as particularly shown in FIG.

1. As will be described in subsequent paragraphs herein, the cable passages 234 provide a means for maintaining electrical and communications engagement of various electrical and communications devices, even with the power and data center in a closed, retracted configuration.

Figure 2:
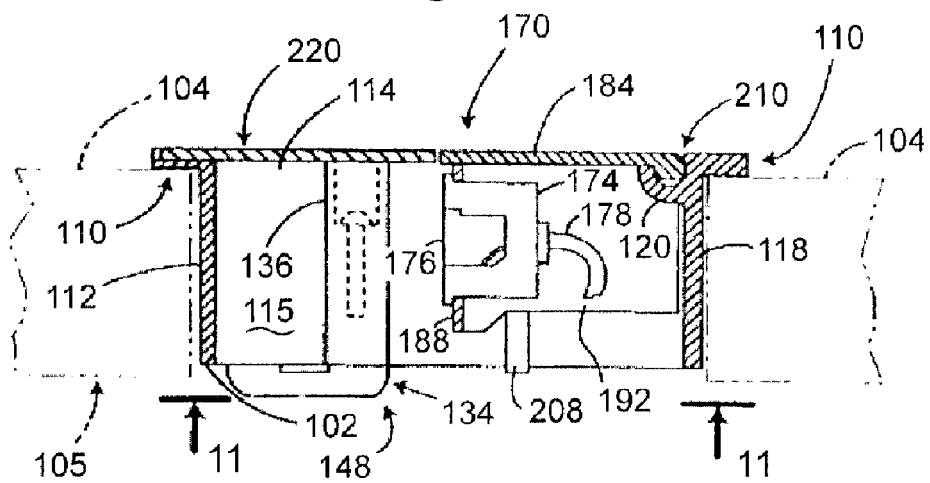
FIG. 2 is a sectional view of the rotatable power and data center illustrated in FIG. 1, taken along lines 2-2 of FIG. 1.

The operation of the power and data center 100 will now be described with respect to all of FIGS. 1-17. After initially being assembled, the power and data center 100 may have a configuration as illustrated in FIGS. 1 and 2. This configuration may be characterized as the Aclosed, retracted configuration@ for the power and data center 100. In this configuration, the cover 220 is in a substantially planar configuration, with the pivot arms 230 abutting the upper surfaces of the slots 126 formed within the horizontal flange or lip 110. In this configuration, and as primarily shown in FIG. 2, the cover 220 can rest not only upon the upper surfaces of the slots 126, but may also partially rest on the upper surfaces of the bushings 136 formed in the side walls 114, 116 of the stationary housing 106. Alternatively, the cover 220 may not necessarily rest on the upper portion of the bushings 136, but instead may be adjacent the tops of the bushings 136. In this configuration, the bushings 136 would still protect against the cover 220 being substantially bent or otherwise damaged through the user accidentally forcing the cover 220 downward near its forward edge 222, thereby misshaping the cover 220. For the cover 220, this configuration is referred to herein as the Aclosed@ configuration.

Also in this closed, retracted configuration of the power and data center 100, the carriage 170 is in a configuration which may be characterized as a Aclosed@ configuration. This configuration is also shown in FIGS. 1 and 2. In this configuration, the top portion 184 is in a substantially horizontal plane, and the pivot tongues 210 are essentially Alocked@ within the U-shaped channels 124, as shown in dotted line format in FIG. 6. It should be emphasized that although the relative sizing of the U-shaped channels 124 and the pivot tongues 210 are such that the pivot tongues 210 cannot be forceably removed from the U-shaped channels 124 when the carriage 170 is in the closed position shown in FIG. 1, the carriage 170 may still be freely rotated, with the pivot tongues 210 rotating within the U-shaped channels 124.

Figure 15:
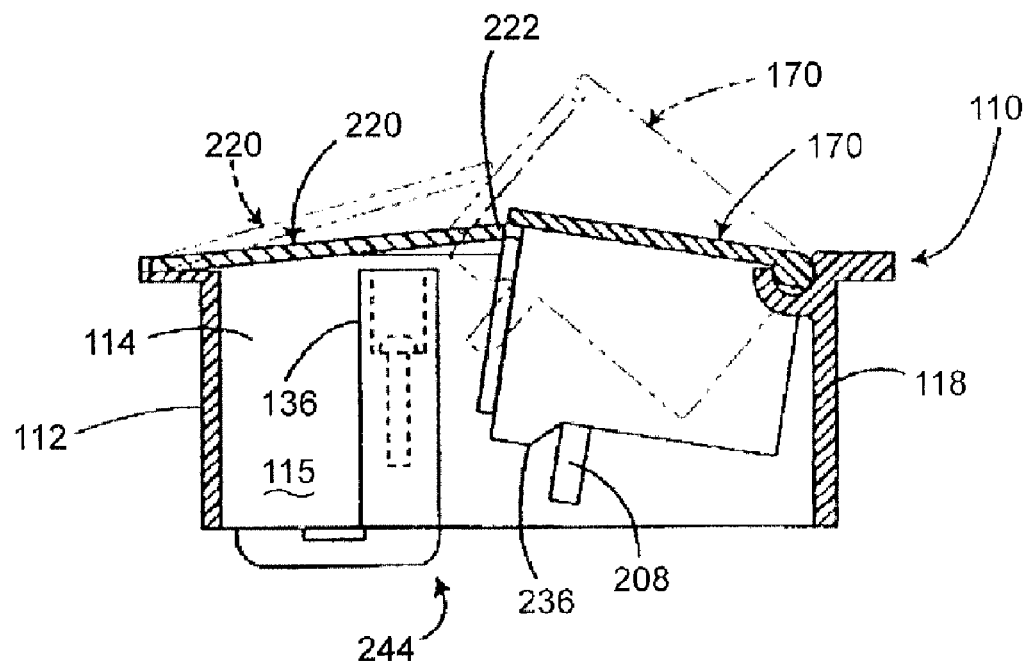
FIG. 15 is a sectional, end view of the rotatable power and data center, similar to FIG. 5 but showing intermediate movement of the cover and carriage from the closed, retracted position to the open, extended position.

When it is desired to utilize the power and data center 100 to energize electrical utility or communication devices, the user may Aopen@ the power and data center 100 by first inserting a finger or thumb into the area forming the finger notch 228 of the cover 220. However, instead of grasping and rotatably moving the cover 220, the user preferably will use the area at the finger notch 228 to actually grasp the carriage 170 so as to rotate the carriage 170 in a clockwise direction as shown in the views of FIGS. 2, 5 and 15. The axis of rotation of the carriage 170 will be substantially through a center line extending longitudinally through each of the coaxial pivot tongues 210. As the carriage 170 is being pivotably rotated from its closed position in a clockwise direction relative to the views of FIGS. 2, 5 and 15, the front portion 188 of carriage 170 will begin to abut the forward edge 222 of the cover 220. This abutment and relative positioning of the cover 220 and carriage 170 is shown in intermediate positions in solid and dotted-line format in FIGS. 15 and 16.

Figure 16:
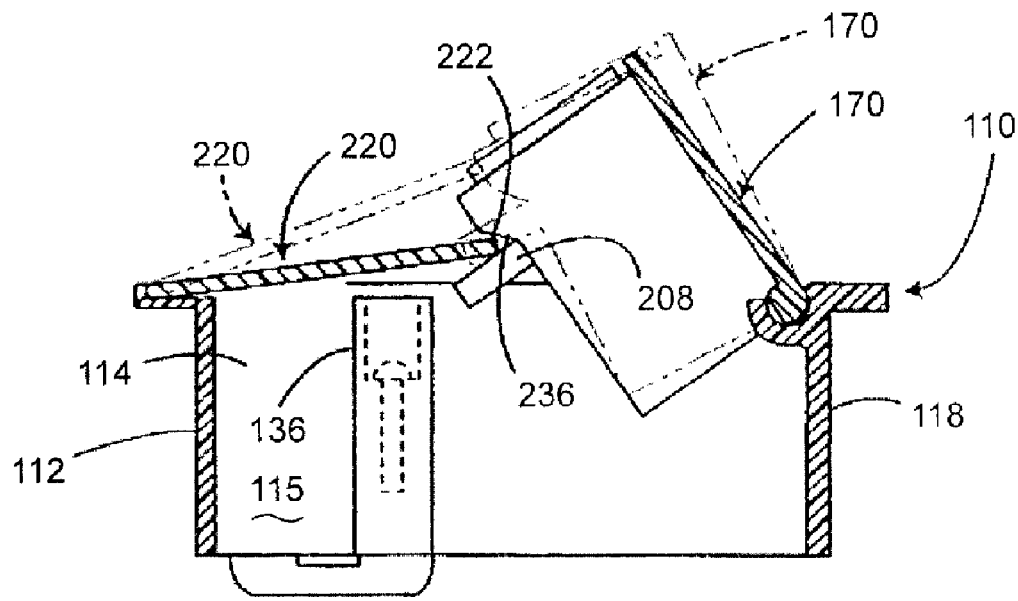
FIG. 16 is a sectional, end view of the rotatable power and data center, similar to FIG. 15 but showing intermediate movement of the carriage and cover between the open, extended position and the closed, retracted position.

The carriage 170 will continue to be rotated clockwise and upwardly until a lower edge 236 (as shown in FIGS. 5, 15 and 16) Aclears@ the forward edge 222 of cover 220. At that instant, the cover 220 will pivot or Afall@ a short distance downwardly, until the forward edge 222 abuts the projecting stub 208 as illustrated in FIG. 16. After clearance of the lower edge 236 from the forward edge 222 of cover 220, the user can then allow the carriage 170 to Afall back@ in a direction such that the carriage 170 is rotatably pivoting back through a counter-clockwise direction relative to the views illustrated in FIGS. 5, 15 and 16. The carriage 170 will essentially rotate until it attains a position as primarily shown in FIG. 5. In this position, the lower edge 236 of the front portion 188 is supported on the cover 220 near the forward edge 222.

Figure 17:
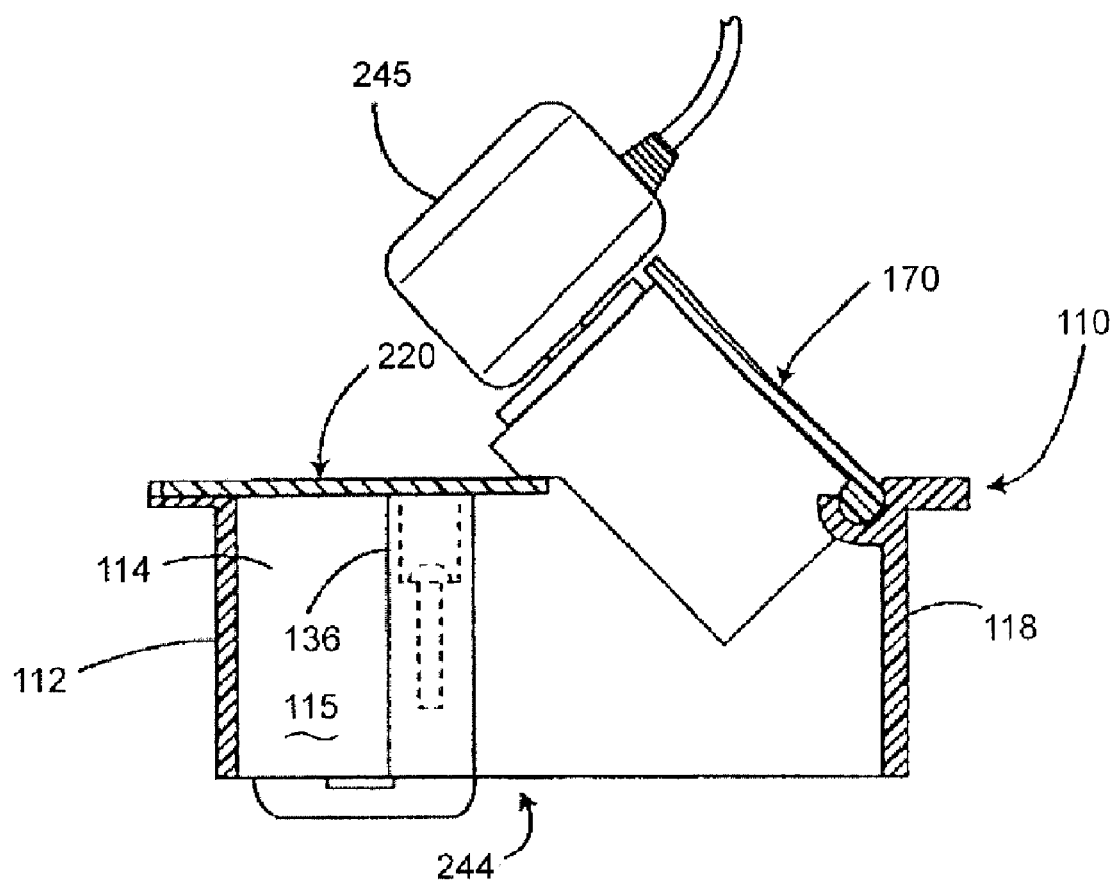
FIG. 17 is a sectional, end view of the rotatable power data center, similar in structure to FIG. 5 but showing interconnection of a relatively large plug-type electrical connector to one of the electrical receptacles when the carriage is in the open, extended position.

As apparent to the reader, the specific, relative positioning of the cover 220 and carriage 170 will depend on the relative sizing of various components of these elements. For example, and as generally shown in this embodiment and particularly FIG. 5, the relative sizing of the various components is such that when the lower edge 236 of the carriage 170 rests on the cover 220, the face of the front portion 188 is positioned essentially at an angle of approximately 45E relative to the horizontal. This particular configuration is also illustrated in FIGS. 3, 4 and 17. In this configuration, the conventional electrical receptacles 180 and the communications receptacles 178 are readily accessible to the user. Accordingly, various electrical utility and communications devices may then be energized through interconnection with their own electrical and communication cables. For example, FIG. 4 illustrates the interconnection of a conventional electrical plug 238 and interconnected electrical cables 240 to one of the conventional electrical receptacles 180. FIG. 4 also illustrates the interconnection of a communication line 242 to one of the communications receptacles 174 comprising a data port 176.

During the rotational and pivotable movement of the carriage 170 relative to the stationary housing 106, the movement is facilitated by the pivotable coupling and interrelationship between the pivot tongues 210 on the carriage 170 and the U-shaped channels 124 of the carriage pivot flanges 120. Also during the movement of the carriage 170 as described in previous paragraphs herein, the cover 220 is also caused to move. This movement is also pivotable and rotatable relative to the stationary housing 106, and facilitated by the pivotable coupling and interrelationship between the pivot mandrels 232 and the cover connecting chambers 128.

The position of the carriage 170 as illustrated in FIG. 5 will be referred to herein as the Aopen@ or Aopen, extended@ position. When it is desired to move the carriage 170 from the open position to the closed position, the user may grasp the carriage 170 and pivot the carriage 170 first in a clockwise rotation (as viewed in FIG. 5). This clockwise, rotational movement will cause the carriage 170 to pivot such that the projecting stub 208 will abut the forward edge 222 of cover 220, as illustrated in solid line format in FIG. 16. Further clockwise, rotational movement of the carriage 170 will cause the projecting stub 208 to move the cover 220 away from its closed position, so that the cover 220 partially pivots in a clockwise, rotational movement, as further illustrated in dotted line format in FIG. 16. This movement of the cover 220 will cause the cover 220 to be moved to a position where the user may readily grasp the cover 220 by the finger notch 228. The user can then rotate the cover 220 toward its 180E position (illustrated in FIG. 3). However, the user only needs to pivotably rotate the cover 220 a sufficient distance so that the carriage 170 may Aclear@ the forward edge 222 of cover 220 as the user releases clockwise, rotational forces on the carriage 170 and allows the carriage 170, through gravitational forces or otherwise, to pivotably rotate in a counter-clockwise direction back to its closed position as illustrated in FIG. 5. When the carriage 170 rotates back to its closed position, the cooperative relationship between the pivot tongues 210 and U-shaped channels 124 will cause the carriage 170 to be maintained in a closed position, absent external rotational forces. After the carriage 170 has been returned to its closed position, the user can then allow the cover 220 to rotate in a clockwise direction so as to again return to its closed position, as illustrated in FIG. 2.

However, the user also has several other options and advantages associated with the power and data center 100. The user can return the carriage 170 from its open position to the closed position while retaining electrical and voice/data interconnections between the voice/data receptacles 174, conventional electrical receptacles 180 and communication cables 242, electrical plugs 238, respectively. If the user retains electrical and/or voice/data interconnection with electrical utility devices or communication devices while the carriage 170 is in the closed position, the user may allow the cover 220 to completely pivot over to its 180E position, as illustrated in FIGS. 3 and 12. While in this position, and with the carriage 170 in its closed position, cord and cable Aexcess@ from electrical utility devices and communication devices can be stored within a recessed portion 244 formed within the rectangular sleeve 108 of the stationary housing 106. It should be emphasized, again, that the electrical plugs 128 and communication cables 242 can remain energized through the component section 172, while the carriage 170 is in the closed position.

Figure 13:
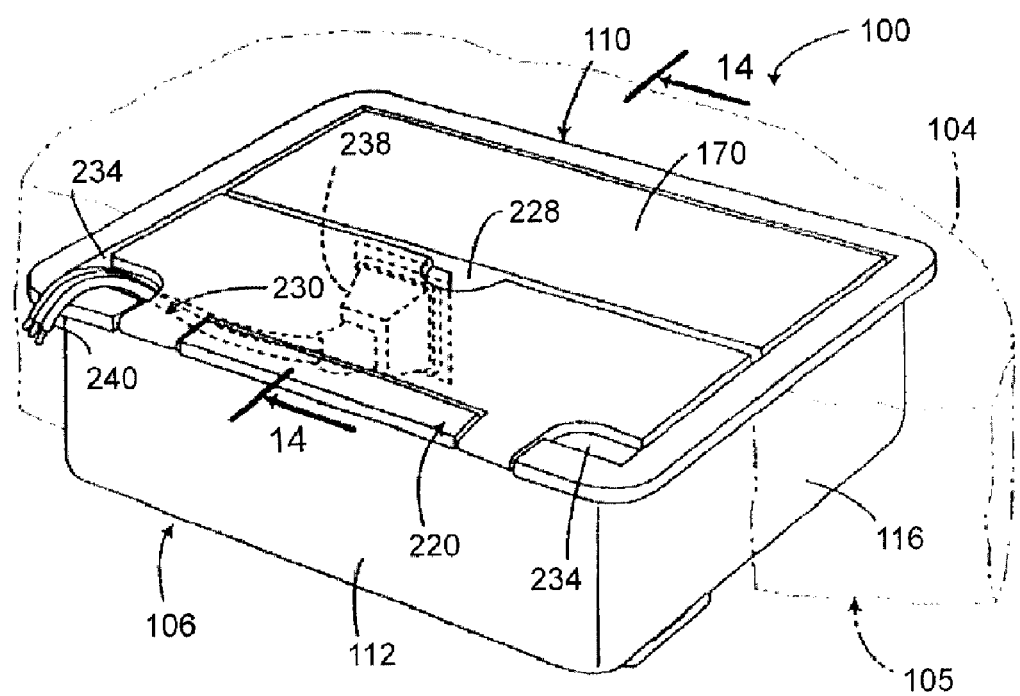
FIG. 13 is a perspective view of the rotatable power and data center of FIG. 1, similar to FIG. 1 but illustrating an electrical cord extending out of the cover and further illustrating interconnection of an electrical plug-type cord with an electrical receptacle of the carriage.

In addition to use and operation of the power and data center 100 with the cover in the 180E position as illustrated in FIGS. 3 and 12, an additional configuration may be utilized, while still retaining energization of electrical utility devices and communication devices through the component section 172. More specifically, and as illustrated in FIGS. 13 and 14, electrical plug 238 and associated electrical cables 240 may remain energized with the component section 172 of carriage 170, and the electrical cables 240 positioned (with the cover 220 in a closed position) so as to extend outwardly through the cable passages 234 formed in the cover 220. For purposes of illustration, only one electrical plug 238 and set of electrical cables 240 is illustrated in FIGS. 13 and 14. However, additional electrical plugs 238 and electrical cables 240 can remain energized with the component section 172 of carriage 170, in addition to continued interconnection of communication cables 242 with voice/data receptacles 174. In such instance, the additional electrical cables 240 and communication cables 242 would also extend outwardly through the cable passages 234. This type of configuration has aesthetic advantages, since the recessed portion 244 and various components of the carriage 170 are substantially hidden from view, when the cover 220 is maintained in a closed configuration.

The power and data center 100 facilitates ease of removal of the carriage 170 from the stationary housing 106. When it is desired to remove carriage 170 from its coupled and pivotable relationship with the stationary housing 106, the carriage 170 is moved to its Avertical@ position, whereby the top portion 184 is in a vertical orientation, as illustrated in solid line format in FIG. 6. In this configuration, the pivot tongues 210 are positioned as shown in FIG. 6 relative to the U-shaped channels 124. This positioning and the relative sizing and shaping of the tongues 210 and channels 124 allow the carriage 170 to be moved upwardly so that the tongues 210 are removed from the channels 124. As also earlier described, assembly and intercoupling of the carriage 170 with the stationary housing 106 requires merely a reversal of operation. That is, the carriage 170 is positioned and moved downwardly (as indicated by arrow A in FIG. 6) so that the pivot tongues 210 are inserted within the U-shaped channels 124. The carriage 170 is then rotated in a counter-clockwise position (as viewed in FIG. 6 and shown by arrow B therein) so that the top portion 184 moves to a substantially horizontal position, as shown in dotted line format in FIG. 6. In this configuration, and in essentially any configuration other than the one which provides for a substantially vertical orientation of top portion 184, the pivot tongues 210 are essentially Alocked in@ to the U-shaped channels 124.

Another aspect of the power and data center 100 relates to facilitating use of relatively large plug-type devices. For example, it is relatively common, in today=s industries, to require AC charging of various devices, such as cellular phones, calculators and the like. Many of these devices use charging elements comprising relatively large AC adaptors, such as the adaptor 246 illustrated in FIG. 17. With the open configuration of the carriage 170 having the substantially 45E angular relationship illustrated in FIG. 17, interconnection of a device such as the adaptor 246 to one of the conventional electrical receptacles 180 is relatively easy and other components of the power and data center 100 do not Aget in the way@ or otherwise prevent such interconnection.

One other aspect of the power and data center 100 should be mentioned. Specifically, FIG. 3 illustrates the carriage 170 in a substantially 45E configuration. However, FIG. 3 also illustrates the cover 220 as being in the 180E position. With the elements of the power and data center 100 as described in previous paragraphs herein, the carriage 170 could not be maintained in the 45E position shown in FIG. 3, absent external forces or reorientation of the cover 220. However, in addition to the elements of the power and data center 100 previously described herein, additional elements in the form of bosses or the like could be resiliently positioned on inner surfaces of the walls 114, 116 of the stationary housing 106, with the specific positioning allowing the carriage 170 to be maintained in the position shown in FIG. 3. With such resilient bosses or similar elements, the user could manually force the carriage 170 downward against the bosses when it would be desired to return the carriage 170 to a closed position. Various other arrangements could also be utilized for maintaining the carriage 170 in the position shown in FIG. 3, with the cover 220 maintained in the 180E position as also shown in FIG. 3.

In summary, the power and data center 100 includes a substantial number of advantages. With the carriage 170 in the open position, and the cover 220 in the closed position, the cover 220 essentially Ahides@ the recessed portion 244. This is particularly useful for aesthetic purposes. Another substantially advantageous aspect of the power and data center 100 in accordance with the invention comprises facilitating the use of electrical receptacles and voice/data or Acommunications@ receptacles with external power and data cables, even when the carriage 170 is in the closed position.

The power and data center 100 provides for the recessed portion 244, which allows a substantial area for storage of Aexcess@ wire and cable. In addition, the recessed portion 244 is Aopen@ in its bottom area. Accordingly, even a greater amount of area is therefore provided for wire and cable storage. With respect to the use of the electrical and voice/data receptacles, even when the carriage 170 is in the closed position, the cover 220 can also be closed during use, with the electrical cables 240 and communication cables 242 extending outwardly through the cable passages 234. In accordance with all of the foregoing, substantial and complete use of the power and data center 100 is allowed, even when the power and data center 100 is in a closed, retracted position.

Another substantial advantage resides in the concept that the carriage 170 may be assembled with and removable from the stationary housing 106, without any requirement for the use of tools. That is, such assembly and disassembly is provided merely by extending the carriage 170 in the Avertically oriented @ position as illustrated in solid line format in FIG. 6. In addition, the cover 220 is also capable of assembly with and removal from the stationary housing 106, without requiring tools. Such assembly and disassembly is provided as previously described herein with respect to FIGS. 10, 10A and 10B.

Still further, and as also previously described herein, the depth of the stationary housing 106 is relatively small. For example, in the power and data center 100, the depth of stationary housing 106 is less than the depth of the work surface 104. This relatively short Aprofile@ of the stationary housing 106 provides the user with additional leg room or other storage area below the work surface 106, without intrusion of structural elements of the power and data center 100. With the rotatable interconnection of the carriage 170 to the stationary housing 106, this relatively short profile of the stationary housing 106 can be provided, while still maintaining Astability" of the carriage 170 during use.

As earlier described, the foregoing description of the power and data center 100 comprises a description of a prior art power and data center. The following paragraphs will now describe embodiments of expandable power and data centers in accordance with the invention.

Figure 18:
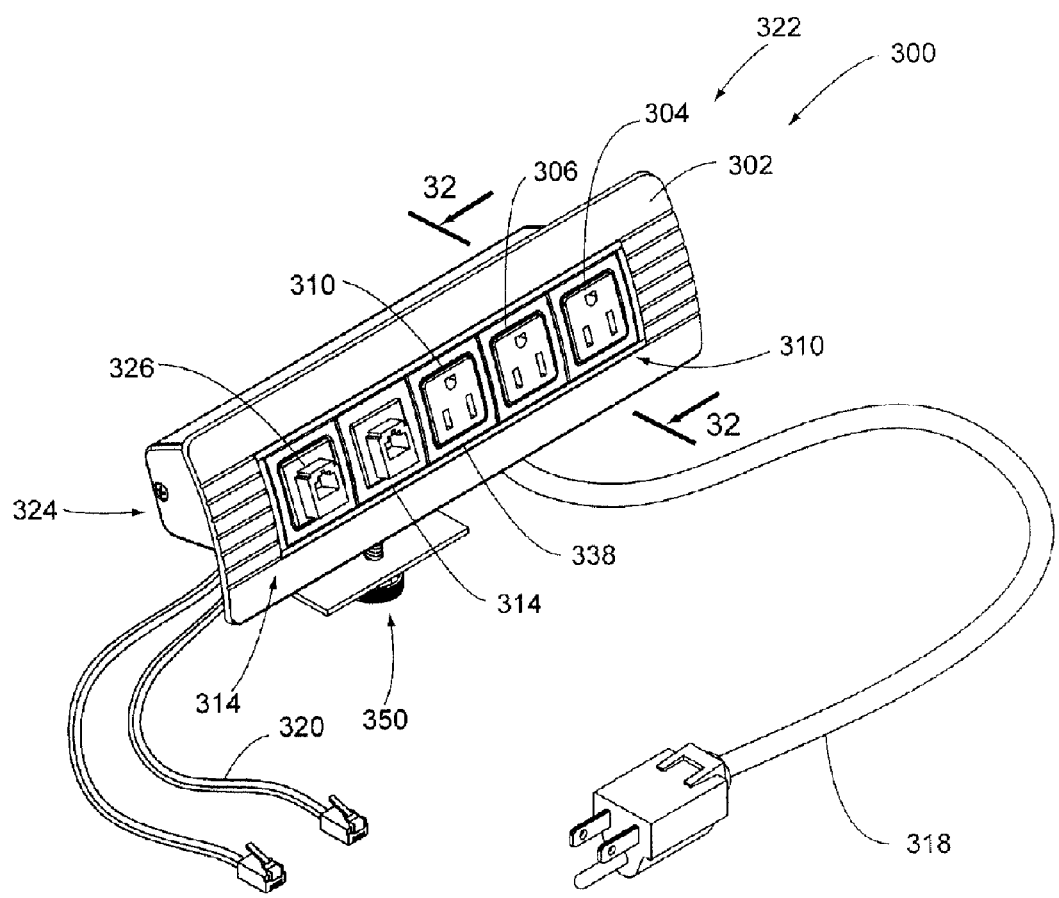
FIG. 18 is a perspective view of one embodiment of an expandable power and data center in accordance with the invention.
Figure 19:
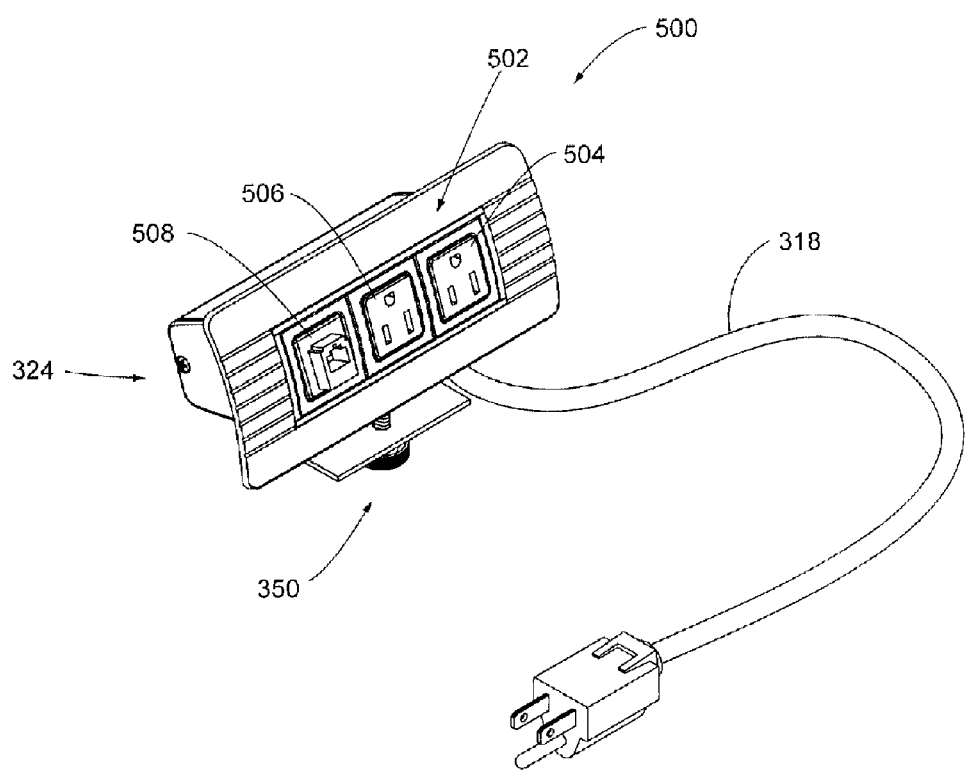
FIG. 19 is a view similar to FIG. 18, but showing a second embodiment with a pair of power receptacles and one data port.
Figure 20:
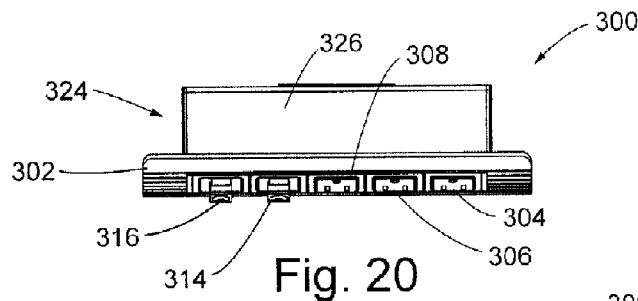
FIG. 20 is a plan view of the power and data center illustrated in FIG. 18.
Figure 21:
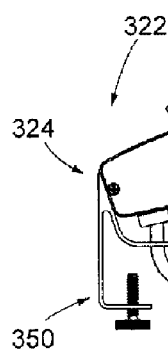
FIG. 21 is a left side view of the power and data center illustrated in FIG. 18, with the power data center connected to a surface edge mounting bracket.
Figure 22:
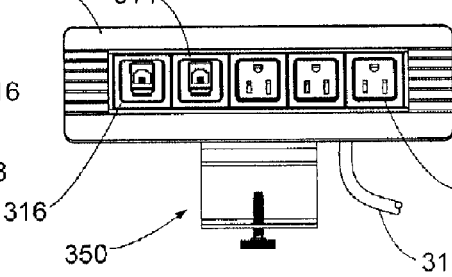
FIG. 22 is a front, elevation view of the power and data center and mounting bracket shown in FIG. 18.
Figure 23:
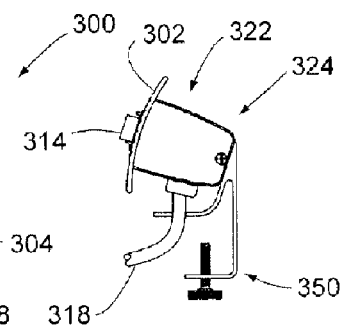
FIG. 23 is a right side view of the power and data center, along with the mounting bracket, shown in FIG. 22.
Figure 24:
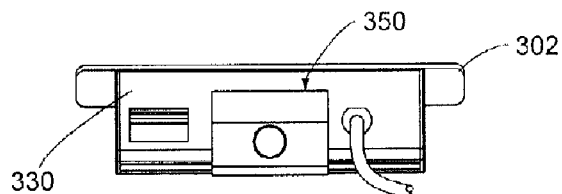
FIG. 24 is an underside view of the power and data center illustrated in FIG. 18.
Figure 25:
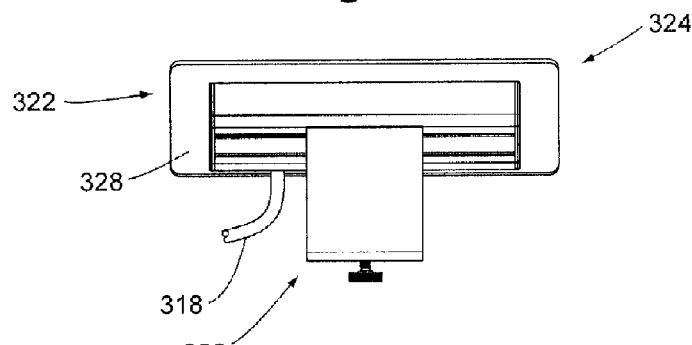
FIG. 25 is an upside down, rear view of the back of the power and data center illustrated in FIG. 18.
Figure 26:
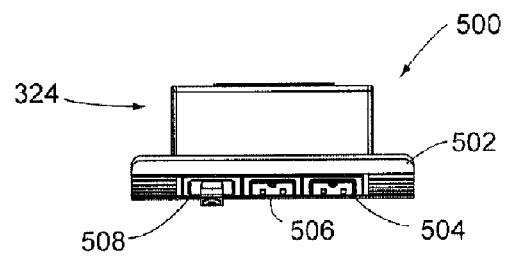
FIG. 26 is a plan view of the power and data center illustrated in FIG. 19.
Figure 27:
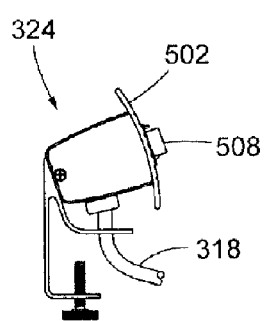
FIG. 27 is a left side, elevation view of the power and data center illustrated in FIG. 19, with a surface edge mounting bracket.
Figure 28:
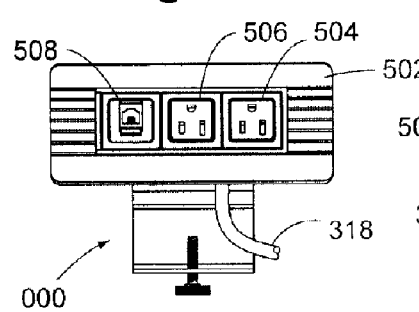
FIG. 28 is a front, elevation view of the power and data center illustrated in FIG. 19.
Figure 29:
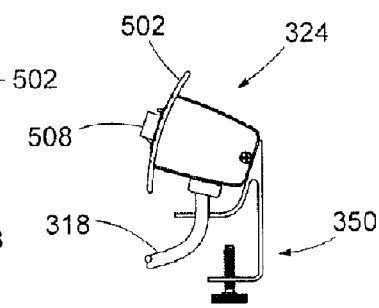
FIG. 29 is a right side view of the power and data center illustrated in FIG. 19.
Figure 30:
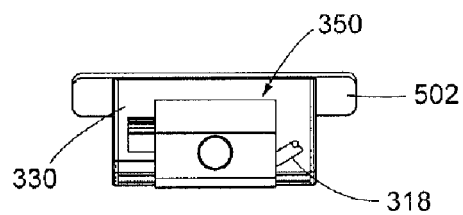
FIG. 30 is an underside view of the power and data center illustrated in FIG. 19.
Figure 31:
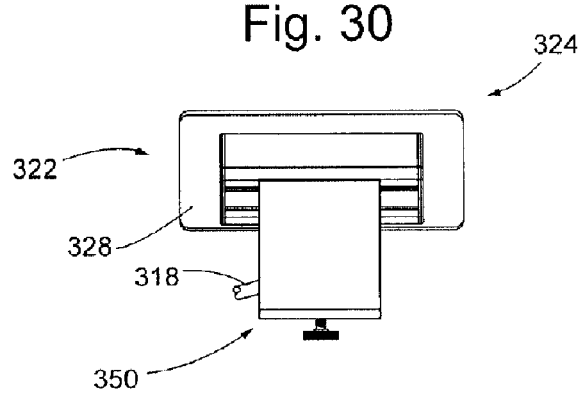
FIG. 31 is a rear view of the power and data center illustrated in FIG. 19.
Figure 32:
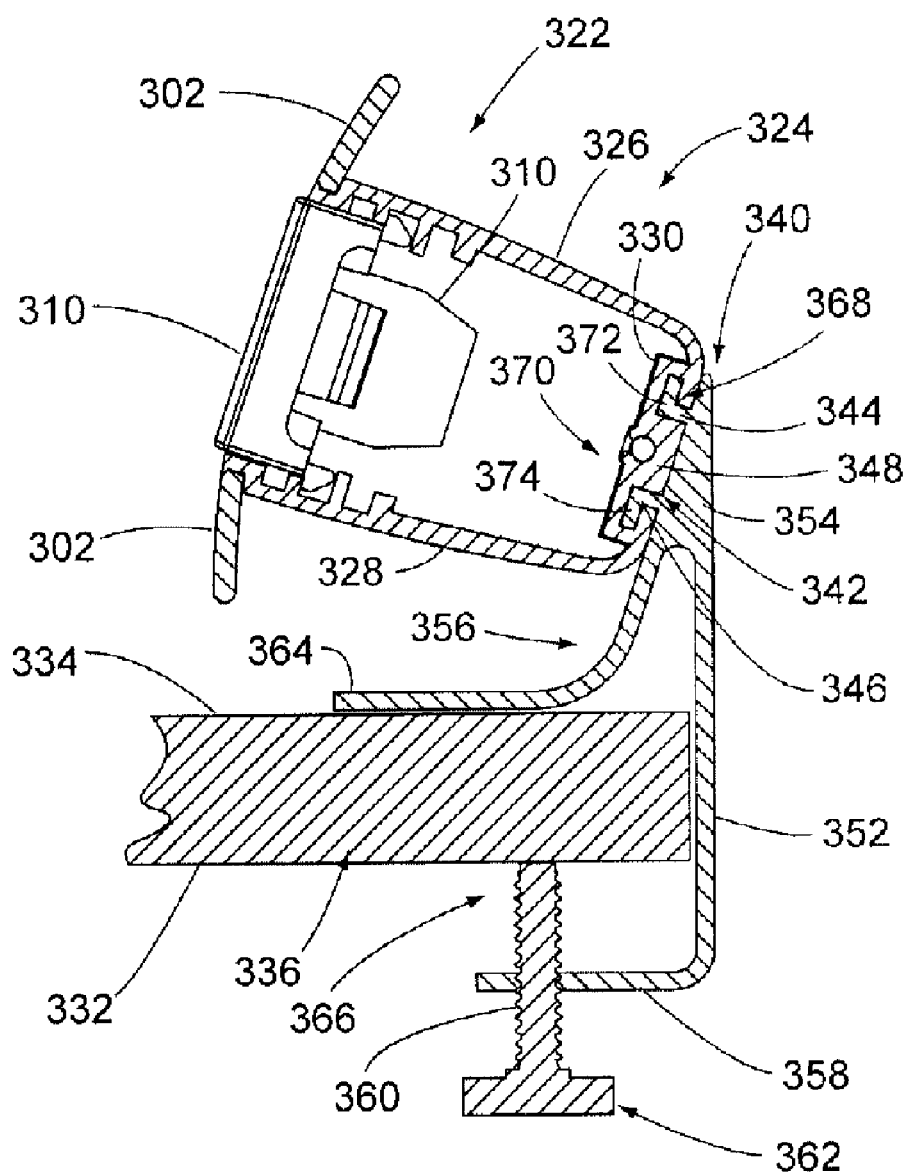
FIG. 32 is a cross-section of the view of the power and data center illustrated in FIG. 18, taken along section lines 32-32 of FIG. 18.

Specifically, reference is made to the embodiment of the invention described herein as expandable power and data center 300, and primarily illustrated in FIGS. 18, 20-25 and 32. The expandable power and data center 300 is adapted to be mounted to a work surface, vertical side surface, wall, surface edge or the like. Such a surface is illustrated as, for example, work surface 332 in FIG. 32. The work surface 332 includes a top planar surface 334 and an underside surface 336, again shown in FIG. 32. The power and data center 300, as illustrated in FIG. 18, includes a front face surface 302. Extending outwardly from an aperture 338 within the face 302 are a set of conventional electrical power receptacles 310. In this particular instance, the power receptacles 310 are illustrated as three-pronged power receptacles, which could conventionally include hot, neutral and ground terminals. The set of power receptacles 310, in this particular embodiment, are three in number and include power receptacles 304, 306 and 308. Correspondingly, also extending forwardly through the aperture 338 of the front face 302 are a set of data ports 312. In this particular embodiment, the set of data port 312 are two in number, and include a first data port 314 and a second data port 316.

The power and data center 300 is adapted to accept energy through energized conductors, such as the electrical power cord 318. It should be emphasized that if desired, multiple power cords 318 could be included within the power and data center 300 Typically, the power cord 318 would be interconnected with a conventional power source (not shown) located below a work surface or at another convenient location. The power cord 318 typically provides a relatively simplistic structure and aesthetically desirable means for transferring power from the conventional power source to one or more of the set of power receptacles 310 associated with the power and data center 300. By "plugging in" to any one of the power receptacles 310, other electrical devices (not shown) may be energized from the set of power receptacles 310.

The set of data ports 312 can be connected to one or more data lines, such as the data line 320 illustrated in FIG. 18. As with the power cord 318, multiple data lines 320 may be employed with the power and data center 300. The data line 320 can be connected to the data ports 312 and, at its opposing end, interconnected to incoming voice or data nodes (not shown) which would typically be located below the work surface 338 or at another similar location. Through the use of the first and second data ports 314, 316, telephones, computer cable connectors or similar interconnections can be made for purposes of providing voice/data or similar communications to appropriate devices, such as telephones and computers.

Turning primarily to FIGS. 18, 20-25 and 32, the expandable power and data center 300 includes, as earlier stated, the front face 302. The power and data center 300 also includes a housing 322 extending rearwardly of the front face 302. The housing 322 is formed by a body shell 324. The body shell 324, as primarily shown in FIG. 32, includes a top portion 326, bottom portion 328, and rear portion 330. If desired, it may be preferable for the body shell 324 to be constructed as a unitary, integrally-molded component. Alternatively, the body shell 324, as well as other components of the power and data center 300, can be constructed of materials such as stainless steel or the like. Also, it should be emphasized that apertures (not specifically shown) are incorporated within the housing 322 for purposes of extending the electrical power cord 318 and data line 320 into the housing 322 and connecting the same to the power receptacles 310 and data ports 312.

Attention is now directed to the rear portion 330 of the housing 322. As expressly shown in FIG. 32, the rear portion 330 comprises, in part, a bracket mount 340. The bracket mount 340 is formed by the rear portion 330 having a central portion 348 which is intermediate a set of L-shaped slots 342. The set of L-slots 342 includes an upper first L-slot 344 and what can be characterized as a lower second L-slot 346. The L-slots 344 and 346 extend horizontally across the length of the rear portion 330, as primarily shown in FIG. 25. As described in subsequent paragraphs herein, the bracket mount 340 formed by the set of L-slots 342 is utilized to releasably engage various configurations of mounting brackets for use in mounting the expandable power and data center 300 to various types of surfaces. The expandable power and data center 300 is adapted to be mounted to any of a number of various configurations of mounting brackets.

For example, the expandable power and data center 300 is illustrated in FIGS. 18, 20-25 and 32 as being releasably secured to a surface edge mounting bracket 350. The surface edge mounting bracket 350 is illustrated in perspective view in FIG. 33. With reference primarily to FIGS. 20-25, 32 and 33, the surface edge mounting bracket 350 includes a vertical section 352. The vertical section 352, as primarily shown in FIG. 32, has a vertical disposition and extends upwardly to a section connector 354 and downwardly below the edge of the work surface 332. The section connector 354 connects with vertical section 352 at its upper end and to a top cantilever brace 356. The top cantilever brace 356 extends downwardly from the section connector 354 and terminates in a lower horizontal section 364. When the mounting bracket 350 is appropriately secured to the work surface 332, the lower horizontal section 364 of the top cantilever brace 356 abuts the top planar surface 334 of the work surface 332. The lower end of the vertical section 352 terminates in a lower clamping section 358. The lower clamping section 358 extends perpendicularly and forwardly from the vertical section 352. The lower clamping section 358 includes a screw aperture 360. A clamping screw 362 or similar securing means may be extended through the aperture 360 for purpose of releasably securing the clamping portion of the mounting bracket 350 to the work surface 332. It should be noted that with this particular mounting bracket 350, the vertical section 352, top cantilever brace 356 and lower clamping section 358 essentially form a slot 366 which opens forwardly. The slot 366 is appropriately configured and sized so that it is adapted to receive an edge of the work surface 332. The clamping screw 362 provides a means for securing the work surface 332 to the mounting bracket 350, independent of the exact size of the work surface 332 relative to the sizes of slot 366.

The elements of the surface edge mounting bracket 350 have now been described, where such elements provide the capability of releasably securing the surface edge mounting bracket 350 to an edge of work surface 332. Further in accordance with the invention, the surface edge mounting bracket 350 (and other mounting brackets subsequently described herein) also have the capability of being releasably secured to the housing 322 of the expandable power and data center 300. Turning again primarily to FIG. 32, the surface edge mounting bracket 350 includes a connector assembly 368. The connector assembly 368 extends forwardly from the previously described center portion 348. The connector assembly 368 includes a pair of parallel and elongated flanges 370 which extend substantially along the length of the mounting bracket 350. The elongated flanges 370 include an upper elongated flange 372 and a lower elongated flange 374. The upper elongated flange 372 is sized and configured so as to securely fit within the first L-slot 344 previously described herein. Correspondingly, the lower elongated flange 374 is adapted to securely fit within the second L-slot 346. Again, this particular configuration is primarily illustrated in FIG. 32. This action of securing the elongated flanges 370 to the L-slots 342 can be done manually. Also, the mounting bracket 350 can be removed from the releasable connection to the housing 322 by the user sliding the elongated flanges 370 out of the set of L-slots 342.

In accordance with the foregoing, the expandable power and data center 300 in accordance with the invention provides the capability of selectively including a desired number of electrical receptacles, data ports or other types of electrical and/or voice data communications connectors for use with the power and data center 300. Further, and as will be described in somewhat greater detail herein, the power and data center 300 is adapted to be utilized with various types of mounting brackets, without having to change the configuration of the power and data center 300 itself. Also, reference is made again to FIG. 18, where the first data port 314 and second data port 316 are illustrated. As shown therein, the first data port 314 has a somewhat different configuration than the second data port 316, at least with respect to the outer connecting portions. It is possible to utilize a voice/data adapter kit for configuring data ports as desired. One such adapter kit is disclosed in my U.S. patent application Ser. No. 11/016,575, entitled VOICE/DATA ADAPTER KIT and filed Dec. 17, 2004.

As earlier described, the expandable power and data center 300 can be utilized with various types of mounting brackets, for various types of surfaces to which the power and data center 300 is to be releasably secured. Examples of these various types of mounting brackets are illustrated in FIGS. 33-38. However, it should be emphasized that other types of mounting brackets can be utilized with the expandable power and data center 300 (and the expandable power and data center 500 subsequently described herein), without departing from the principal concepts of the invention.

Figure 33:
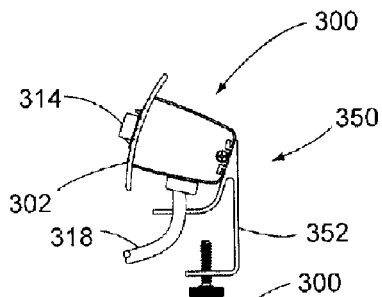
FIG. 33 illustrates the power and data center of FIG. 18 as shown in FIG. 29, and also shows a perspective view of the surface edge mounting bracket used with the power and data center.
Figure 33:
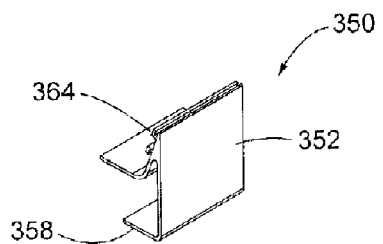
Figure 34:
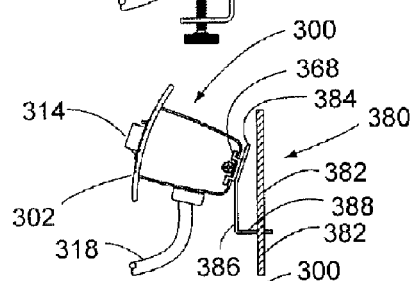
FIG. 34 illustrates a right side view of the power and data center of FIG. 18, with an attached slotted bracket.
Figure 34:
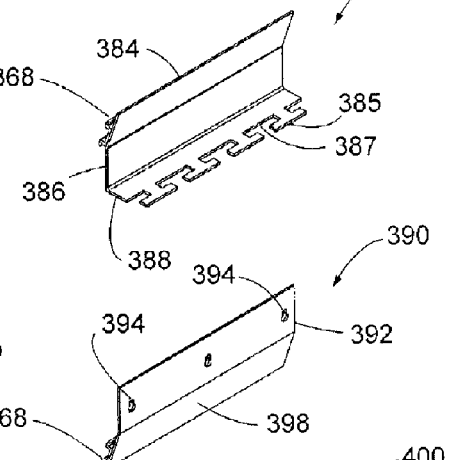

FIG. 33 illustrates the power and data center 300 utilized with the previously described surface edge mounting bracket 350. FIG. 34 illustrates the use of the expandable power and data center 300 with what can be characterized as a slotted mounting bracket 380. The slotted mounting bracket 380 is illustrated in perspective view, and also as secured to a vertical surface 382 in FIG. 34. Specifically, the slotted mounting bracket 380 includes an elongated slanted upper section 384. Extending forwardly of the slanted upper section 384 is a connector assembly 368. The connector assembly 368 can be substantially the same (although possibly varied in length) as the previously described connector assembly 368 utilized with the surface edge mounting bracket 350. Extending downwardly from the slanted upper section 384 is a vertical section 386. At its lower end, the vertical section 386 terminates in a horizontally disposed slotted section 388. As illustrated in FIG. 34, the slotted section 388 includes a set of T-shaped flanges 385 positioned intermediate adjacent T-shaped slots 387. These flanges 385 and slots 387 are adapted to be releasably secured within a vertical surface 382 having this type of slotted configuration. For example, such a configuration is often found on utility pegboards and the like.

Figure 35:
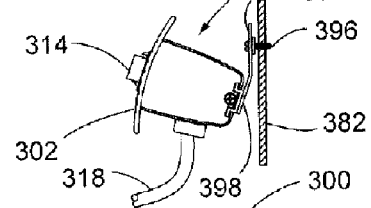
FIG. 35 illustrates a right side view of the power and data center of FIG. 18, and further illustrates a perspective view of a slotted hole bracket.
Figure 35:
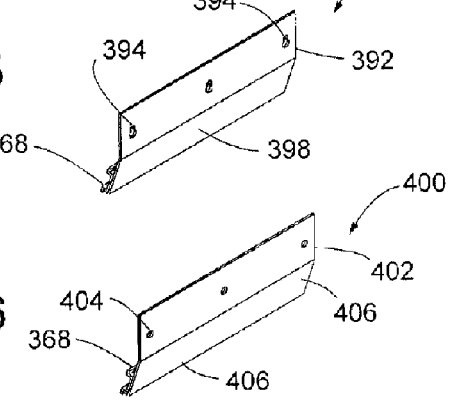

A further mounting bracket is illustrated in FIG. 35, and is referred to herein as the slotted hole mounting bracket 390. The slotted hole mounting bracket 390 includes an upper vertical section 392. The vertical section 392, as shown in FIG. 35, includes a series of slotted holes 394. The vertical section 392 terminates at its lower portion in a slanted section 398. The connector assembly 368 is connected to the forward portion of the slanted section 398. As further shown in FIG. 35, a series of conventional hangers 396 or the like may be utilized and received within the slotted holes 394, for purposes of securing the mounting bracket 398 to a vertical surface 382 having the types of hangers and the like which are conventionally used with the types of slotted holes 394 illustrated in FIG. 35.

Figure 36:
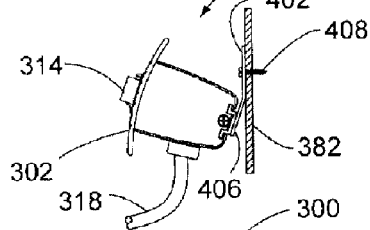
FIG. 36 illustrates a right side view of the power and data center of FIG. 18, showing the power and data center with a screw mount bracket.

A further mounting bracket, referred to as a screw mount mounting bracket 400, is illustrated in FIG. 36. The screw mount mounting bracket 400 includes an upper vertical section 402. Conventional screw holes 404 extend through the vertical section 402. The screw mount mounting bracket 400 also includes a slanted section 406 at the lower portion of the vertical section 402. The connector assembly 368 extends forwardly from the slanted section 406. Screws 408 or similar connecting means can be received within the screw holes 404 and connected to similar holes within work surface 382 to secure the power and data center 300 to the work surface 382 through the use of the screw mount mounting bracket 400.

Figure 37:
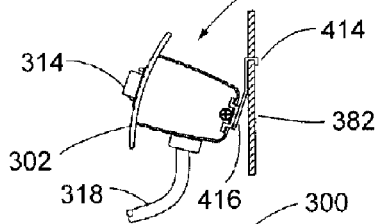
FIG. 37 is a right side view of the power and data center of FIG. 18, showing a perspective view of the power and data center with a hang bracket.
Figure 37:
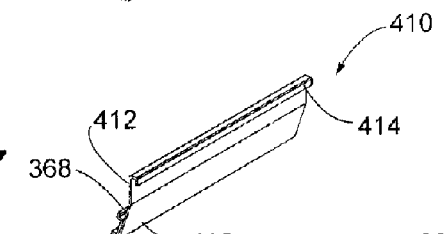

FIG. 37 illustrates a mounting bracket which can be characterized as a hang mounting bracket 410. The hang mounting bracket 410 includes a vertical section 412 at the upper portion thereof. However, extending rearwardly from the top portion of the vertical section 412 is a hanger flange 414. The hanger flange 414 has an elongated configuration as shown in FIG. 37. Extending downwardly from the lower portion of the vertical section 412 is a slanted section 416. The connector assembly 368 extends forwardly from the slanted section 416, for purposes of connection to the power and data center 300. The hanger flange 414 is adapted to be releasably secured within a correspondingly-sized slot within the work surface 382. This type of slot within the work surface 382 is relatively well known.

Figure 38:
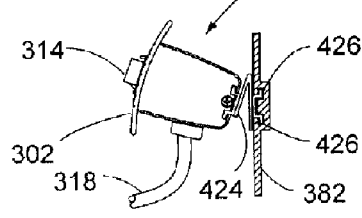
FIG. 38 illustrates a right side view of the power and data center illustrated in FIG. 18, but showing the power and data center with a perspective view of a slat wall bracket.
Figure 38:
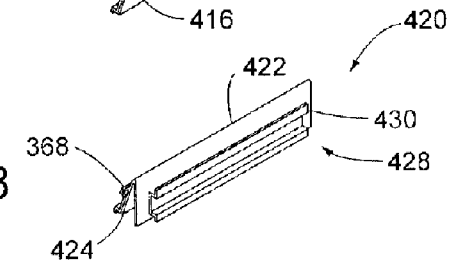

A still further mounting bracket is illustrated in FIG. 38 as a slat wall mounting bracket 420. The mounting bracket 420 includes a vertical section 422. A slanted section 424 extends downwardly from the top of the vertical section 422. The connector assembly 368 extends forwardly from the slanted section 424, for connection to the power and data center 300. Extending rearwardly from the vertical section 422 is a flange set 428, having a cross-sectional configuration and elongated configuration as illustrated in FIG. 38. The flange set 428 includes a pair of elongated and parallel flanges 430 having somewhat of an L-shaped configuration. The flanges 430, in fact, have a configuration substantially similar to the elongated flanges 370 of the connector assemblies 368. As further shown in FIG. 38, the work surface 382 includes a pair of L-slots 426. The L-slots 426 are sized and configured so as to receive the elongated flanges 430 of the flange set 428. In this manner, the slat wall mounting bracket 420 is secured to the vertical surface 382.

In accordance with the foregoing, an expandable power and data center 300 has been described, for use with various types of mounting brackets for securing the power and data center 300 to various surfaces.

As earlier stated, power and data centers in accordance with the invention can be made "expandable" in that the number of power and communications "outlets" can be varied. This variation can occur, and yet the exact same sized and configured mounting brackets may be utilized to secure the power and data centers in accordance with the invention to appropriate surfaces. That is, different configurations of mounting brackets are not required.

To illustrate this concept, a second embodiment of a power and data center in accordance with the invention is described herein as expandable power and data center 500. The expandable power and data center 500 is illustrated in FIGS. 19 and 26-31. As apparent from the drawings, the expandable power and data center 500 has a structural configuration substantially corresponding to that of the expandable power and data center 300. However, the expandable power and data center 500 is narrower in width than the expandable power and data center 300. Specifically, the expandable power and data center 300 was adapted to hold five different types of power and/or communications outlets. In the particular expandable power and data center 300 illustrated herein, the power and data center 300 incorporates a set of power receptacles 310 comprising three in number. Correspondingly, the power and data center 300 also comprises a set of data ports 312 which are two in number. In the particular expandable power and data center embodiment 500 illustrated in FIGS. 19 and 26-31, only one data port and only two power receptacles are illustrated. Specifically, the expandable power and data center 500 includes a set of power receptacles 502 comprising a first power receptacle 504 and a second power receptacle 506. Still further, the expandable power and data center 500 includes only one data port 508. Again, however, the expandable power and data center 500, while being sized so as to include only three types of power and/or communication outlet devices, may still use the same sized and configured mounting brackets as used and shown herein with the expandable power and data center embodiment 300. That is, although the drawing illustrations set forth in FIGS. 33-38 were described with respect to the expandable power and data center 300, the same drawings could be "characterized" as corresponding to the same mounting brackets 350, 380, 390, 400, 410 and 420 being used with the expandable power and data center 500.

In view of the foregoing, it is clear that the expandable power and data center 500 differs from the expandable power and data center 300 only in size and the number of power and/or communications outlet devices which may be supported. Accordingly, like reference numbers will be used for describing the expandable power and data center 500 as were used for corresponding components for the expandable power and data center 300. However, it should be understood that although these same reference numbers are being utilized, and the functions of these components in power and data center 300 and power and data center 500 are the same, these components may vary in size between the two embodiments.

With the foregoing understood, the expandable power and data center 500, like the expandable power and data center 300, includes a face 302. As earlier described, the expandable power and data center 500 includes a set of power receptacles 502, comprising first and second power receptacles 504, 506, respectively. The expandable power and data center 500, unlike the expandable power and data center 300, includes only one data port 508.

The expandable power and data center 500 also includes a power cord 318 and data line 320. The power and data center 500 is formed by a housing 322 having a body shell 324. The body shell 324 includes a top portion 326, bottom portion 328, and rear portion 330. Like the expandable power and data center 300, the power and data center 500 includes a bracket mount 340 having a set of L-slots 342. The L-slots 342 include a first L-slot 344 and a second L-slot 346. A center portion 348 is formed between the L-slots 344, 346.

As earlier stated, the expandable power and data center 500 can be utilized with the same mounting brackets previously described herein as being used with the expandable power and data center 300. FIGS. 26-31 illustrate the expandable power and data center 500, as used with the surface edge mounting bracket 350 previously described herein. Also, it should be noted that the data port 508 can utilize various types of adapters from an adapter kit or the like for purposes of different types of data port connections.

It will be apparent to those skilled in the pertinent arts that other embodiments of power and data centers in accordance with the invention may be designed. That is, the principles of power and data centers in accordance with the invention are not limited to the specific embodiments described herein. For example, various combinations of electrical receptacles and voice/data communication receptacles may be utilized. Accordingly, it will be apparent to those skilled in the arts that modifications and other variations of the above-described illustrative embodiments of the invention may be effected without departing from the spirit and scope of the novel concepts of the invention.

What is claimed is:

1. A power and data center adapted to be mounted to a work surface, vertical side surface, wall, or surface edge, said power and data center comprising:

a front face surface having an aperture therein;

at least one electrical power receptacle extending outwardly from said aperture within said face surface;

at least one data port extending forwardly through said aperture of said face surface;

energized conductors for providing electrical energy to said power receptacle;

at least one data line connected to said data port;

a housing extending rearwardly from said front face surface, and having a rear portion comprising, in part, a bracket mount;

said bracket mount being formed by said rear portion having a central portion intermediate a set of L-shaped slots, said slots extending horizontally across the length of said rear portion; and said slots being utilized to releasably connect a plurality of configurations of mounting brackets to said bracket mount, for mounting said power and data center to a plurality of differing types of surfaces, each of said mounting brackets comprising a set of flanges which engage said set of L-shaped slots.

* * * * *